United States Patent
Terashima et al.

(10) Patent No.: US 7,999,490 B2
(45) Date of Patent: Aug. 16, 2011

(54) LIGHT SOURCE, PROJECTOR, AND METHOD FOR DRIVING LIGHT SOURCE

(75) Inventors: Tetsuo Terashima, Chino (JP); Kentaro Yamauchi, Ashiya (JP); Takeshi Takezawa, Matsumoto (JP); Kazuo Okawa, Matsumoto (JP); Keishi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 477 days.

(21) Appl. No.: 12/258,958

(22) Filed: Oct. 27, 2008

(65) Prior Publication Data

US 2009/0108770 A1  Apr. 30, 2009

(30) Foreign Application Priority Data

Oct. 31, 2007 (JP) ................................ 2007-282894

(51) Int. Cl.
*H05B 37/00* (2006.01)

(52) U.S. Cl. .......................... 315/291; 315/297; 315/247

(58) Field of Classification Search .................. 315/291, 315/297, 311, 224, 225, 247, 49–59, 94–107
See application file for complete search history.

(56) References Cited

U.S. PATENT DOCUMENTS

| | | | |
|---|---|---|---|
| 6,239,556 B1 | 5/2001 | Derra et al. | |
| 6,590,348 B2 * | 7/2003 | Takahashi et al. | 315/209 R |
| 6,717,375 B2 * | 4/2004 | Noguchi et al. | 315/291 |
| 7,250,732 B2 * | 7/2007 | Rahmane et al. | 315/291 |
| 7,288,899 B2 * | 10/2007 | Akiyama | 315/291 |

FOREIGN PATENT DOCUMENTS

| | | |
|---|---|---|
| JP | A-2003-036992 | 2/2003 |
| JP | A-2003-264094 | 9/2003 |
| JP | A-2004-039563 | 2/2004 |
| JP | A-2005-209572 | 8/2005 |
| JP | A-2005-276623 | 10/2005 |
| JP | A-2005-310484 | 11/2005 |
| JP | A-2006-059790 | 3/2006 |
| JP | A-2008-192388 | 8/2008 |
| WO | WO 2004/066687 A1 | 8/2004 |

* cited by examiner

*Primary Examiner* — James Cho
(74) *Attorney, Agent, or Firm* — Oliff & Berridge, PLC

(57) ABSTRACT

A light source includes an arc tube having a first electrode and a second electrode that emit light by discharge between the electrodes, and a driving unit that supplies a current between the first electrode and the second electrode and can change at least a waveform of frequency and waveform of the supplied current. The driving unit can perform lighting drive of the arc tube, using a driving waveform formed by combining a first lighting waveform having a maximum current value at a part other than a half-cycle rear end of the waveform and a second lighting waveform having a maximum current value at the half-cycle rear end of the waveform.

20 Claims, 13 Drawing Sheets

LIGHT SOURCE, PROJECTOR, AND METHOD FOR DRIVING LIGHT SOURCE

BACKGROUND

1. Technical Field

The present invention relates to a light source having a discharge lamp including a pair of electrodes, a method for driving the light source, and a projector having the light source incorporated therein.

2. Related Art

Since electrodes of a discharge light emitting lamp wears with the lighting time and the distance between the electrodes that influences illuminance of the lamp increases with time, restraining the increase in the distance between electrodes is a problem.

To deal with this problem, in a first technique, a rise in the voltage between the electrodes due to the increase in the distance between the electrodes is monitored. When the voltage value exceeds an upper limit value, the lighting frequency is raised in stages every predetermined time to 300 Hz or higher, as disclosed in JP-A-2005-276623. Thus, a protrusion is reformed on the distal end side of the electrodes. The rise in the voltage, that is, the increase in the distance between the electrodes, is restrained.

Also, to deal with the above problem, in a second technique, a lighting frequency selected from the range of 60 to 1000 Hz is set as a steady-state lighting frequency, and a low frequency selected within the range of 5 to 200 Hz is inserted with a proper length and in proper timing, as disclosed in JP-A-2006-59790. Thus, the surface on the distal end side of the electrodes is melted and flattened while the main protrusion is left. An arc jump is thus restrained and a protrusion is re-formed.

Moreover, to deal with the above problem, in a third technique, the frequency, and the quantity and timing of a triangle wave to be superimposed are changed in accordance with the voltage or current between the electrodes, as disclosed in Japanese Patent No. 3,934,436. This technique uses a driving waveform on which a triangle wave is superimposed. As the quantity of superimposition of the triangle wave along the rise in the voltage between electrodes, a spot, that is, a protrusion, can be grown to reduce the voltage between the electrodes.

There are other techniques including a driving method in which a change such as arc anomaly is detected from a lamp voltage or the like and a steady-state driving waveform or the like is adjusted, or a driving method in which a use integration time is monitored and the driving waveform is adjusted in accordance with the use integration time, as disclosed in JP-A-2004-39563, JP-A-2003-264094, JP-A-2005-209572, WO2004/066687, and JP-A-2005-310484.

However, though the method of driving with a high-frequency current can form a protrusion on the distal end side of electrodes relatively quickly, as in the first technique and the second technique, the method has problems that the formed protrusion is weak and more easily moves on the distal end side of the electrodes, and that plural protrusions are formed. As deterioration continues, this further leads to problems including instability of the position of the protrusion formed on the electrodes, flattening of the distal end side of the electrodes due to wear, acceleration of change in the protrusion due to the combined effect of these, acceleration of wear of the distal end side of the electrodes in endurance, and change in the quantity of light intake to an optical system.

Meanwhile, the method of adjusting the quantity of superimposition of a triangle wave in accordance with the voltage between electrodes can grow a protrusion by adjusting the quantity of superimposition of the triangle wave, as in the third technique. However, the quantity of superimposition of the triangle wave alone does not enable formation of a protrusion having a sufficient size and a sufficiently stable shape. Therefore, this method is only slightly superior to a method using a general rectangular wave, which is traditionally used, or a method of adding a pulse waveform to the rear end of the rectangular wave.

Also in the other techniques, the formed protrusion tends to be weak. A protrusion having a sufficient size and a sufficiently stable shape cannot be formed.

SUMMARY

An advantage of some aspect of the invention is that a light source and a driving method for the light source are provided in which the distal end side of electrodes can be restored in accordance with the wear state and in which a large and stable protrusion can be formed in the restoration.

Another advantage of some aspect of the invention is that a projector having the light source incorporated therein is provided.

A light source according to an aspect of the invention includes an arc tube having a first electrode and a second electrode that emit light by discharge between the electrodes, and a driving unit that supplies a current between the first electrode and the second electrode and can change at least a waveform of frequency and waveform of the supplied current. The driving unit can perform lighting drive of the arc tube, using a driving waveform formed by combining a first lighting waveform having a maximum current value at a part other than a half-cycle rear end of the waveform and a second lighting waveform having a maximum current value at the half-cycle rear end of the waveform.

In the light source, the driving unit performs lighting drive of the arc tube, using a driving waveform formed by combining a first lighting waveform having a maximum current value at a part other than a half-cycle rear end of the waveform and a second lighting waveform having a maximum current value at the half-cycle rear end of the waveform. Therefore, the growing state including the shape or the like of a protrusion formed on the distal end side of the electrodes can be adjusted by adjustment of the combination ratio of the first lighting waveform and the second lighting waveform. Here, while the first lighting waveform has the maximum current value at a part other than the half-cycle rear end and tends to relatively restrain the growth of a protrusion, a thick stable protrusion can be formed. Also, while the second lighting waveform has the maximum current value at the half-cycle rear end and tends to form a relatively thin protrusion, expansion of the protrusion can be promoted relatively well.

According to a specific embodiment or viewpoint of the invention, in the light source, when an inter-electrode distance between the first electrode and the second electrode becomes longer than a predetermined value, the driving unit performs the lighting drive using at least the first lighting waveform. In this case, a protrusion having stable shape with a sufficient thickness on the base side can be formed on the distal end side of the first electrode and the second electrode.

According to another embodiment of the invention, in the lighting drive, the driving unit changes a temporal rate at which the first lighting waveform and the second lighting waveform are combined, with the lapse of time. Here, the change with the lapse of time includes continuous change and staged change. In this case, the size of a protrusion that gradually grows on the distal end side of the electrodes can be adjusted in the lighting drive, and the ultimate shape can be controlled with a certain degree of freedom.

According to still another embodiment of the invention, in the lighting drive, the driving unit makes the period of using the first lighting waveform relatively short as the inter-electrode distance becomes relatively short. In this case, the shape of the protrusion formed on the distal end side of the electrodes can be made thick at the base and thinner toward the distal end. The overall shape of the protrusion can be tapered.

According to still another embodiment of the invention, in the lighting drive, the driving unit causes the driving period of the first lighting waveform to be equal to or shorter than the driving period of the second lighting waveform. In this case, increase in the rate of combination of the first lighting waveform is limited, and for example, the growth of the protrusion on the distal end side of the electrodes can be prevented from being restrained.

According to still another embodiment of the invention, in the lighting drive, the driving unit is provided with a period in which the first lighting waveform and the second lighting waveform are driven with different frequencies from each other. In this case, the effect of gradually forming a relatively thick protrusion by the first lighting waveform and the effect of quickly forming a relatively thin protrusion by the second lighting waveform are promoted or restrained. Controllability of the growth of the protrusion can be improved.

According to still another embodiment of the invention, the frequency of the first lighting waveform is lower than the frequency of the second lighting waveform. In this case, the tendency to heat the distal end side of the electrodes as a whole by the first lighting waveform is reinforced. The tendency to gradually form a relatively thick protrusion can be strengthened.

According to still another embodiment of the invention, in the lighting drive, the driving unit changes the frequency of at least one of the first lighting waveform and the second lighting waveform with the lapse of time. Here, the change with the lapse of time includes continuous change and staged change. In this case, the effect of gradually forming a relatively thick protrusion by the first lighting waveform and the effect of quickly forming a relatively thin protrusion by the second lighting waveform can be adjusted with time. The shape of the protrusion can be made close to an intended shape.

According to still another embodiment of the invention, in the lighting drive, the driving unit performs driving to change the second lighting waveform to a relatively high frequency as the inter-electrode distance becomes relatively short. In this case, a tendency for the shape of the protrusion formed on the distal end side of the electrodes to become thinner toward the distal end can be generated. The tapered protrusion can be formed more easily.

According to still another embodiment of the invention, in the lighting drive, the driving unit is capable of carrying out a first process of driving the first lighting waveform and the second lighting waveform while changing the temporal rate at which the first lighting waveform and the second lighting waveform are combined, and a second process of driving the first lighting waveform and the second lighting waveform while changing the frequency of at least one of the first lighting waveform and the second lighting waveform to a higher frequency than in the first process. When the inter-electrode distance becomes shorter to a distance equal to or less than a predetermined threshold value, the driving unit switches from the first process to the second process. In this case, a thick foundation can be formed at the base in the first process and a thin sharp end part can be formed on the distal end side in the second process. Particularly in the first process, the foundation can be formed with its diameter reduced by adjustment of the combination rate of the first lighting waveform and the second lighting waveform. Particularly in the second process, the sharp end part can be formed with its diameter reduced by frequency adjustment of the second lighting waveform and the first lighting waveform.

According to still another embodiment of the invention, the distal end side of at least one of the first electrode and the second electrode is melted by a predetermined quantity before either the first process or the second process. In this case, an unnecessary protrusion on the distal end side of the electrodes can be melted and smoothed. Growth of an unintended protrusion can be avoided.

According to still another embodiment of the invention, after the melting, preparation is carried out by supplying a high-frequency current is supplied between the first electrode and the second electrode until one of a predetermined time, a predetermined inter-electrode voltage and a predetermined inter-electrode current is reached, and after that, supplying a low-frequency current between the first electrode and the second electrode. In this case, a small protrusion can be formed as a starting point to grow a protrusion at the center of the smoothed surface on the distal end side of the electrodes.

According to still another embodiment of the invention, after performing driving in the preparation, the driving unit carries out driving in the first process. In this case, the small protrusion as the starting point can be thickened to form a base part first.

According to still another embodiment of the invention, the light source further includes a determining unit that determines the state of the arc tube. The determining unit determines the state of the distal end side of the first electrode and the second electrode on the basis of a lamp voltage, current, and illuminance of the arc tube, and their change values. In this case, the state of the distal end side of the electrodes can be determined by the determining unit. The timing of lighting drive, the combination rate of the first lighting waveform and the second lighting waveform and the like can be adjusted. Thus, a protrusion having a proper shape can be formed on the distal end side of the electrodes in proper timing.

A projector according to another aspect of the invention includes the above light source, a light modulator that is illuminated by illumination light from the light source, and a projection system that projects an image formed by the light modulator.

Since the projector uses the above light source, lighting drive as described above can be carried out and a protrusion having a stable shape can be formed on the distal end side of the first electrode and the second electrode. Therefore, the life of the light source can be extended and a projector that can project a bright projection image over a long period can be provided.

A method for driving a light source according to still another aspect of the invention is a method for driving a light source that supplies a current between a first electrode and a second electrode of discharge light emitting type. The method includes changing at least a waveform, of frequency and waveform of the current supplied between the first electrode and the second electrode, thereby changing a driving state, and performing lighting drive of an arc tube using a driving waveform formed by combining a first lighting waveform having a maximum current value at a part other than a half-cycle rear part of the waveform and a second lighting waveform having a maximum current value at the half-cycle rear part of the waveform.

In the light source driving method, the state of growth of a protrusion formed on the distal end side of the electrodes can be adjusted by adjustment of the combination ratio of the first lighting waveform and the second lighting waveform.

In a specific embodiment of the invention, in the driving method, when an inter-electrode distance between the first electrode and the second electrode becomes longer than a predetermined value, the lighting drive is carried out using at least the first lighting waveform. In this case, a protrusion having a stable shape with a sufficient thickness on the base side can be formed on the distal end side of the first electrode and the second electrode.

BRIEF DESCRIPTION OF THE DRAWINGS

The invention will be described with reference to the accompanying drawings, wherein like numbers reference like elements.

FIG. 6A is a graph showing an exemplary first lighting waveform and FIG. 63 is a graph showing an exemplary second lighting waveform.

DESCRIPTION OF EXEMPLARY EMBODIMENTS

First Embodiment

Hereinafter, the structure, operation and the like of a light source according to a first embodiment of the invention will be described.

Figure 1:
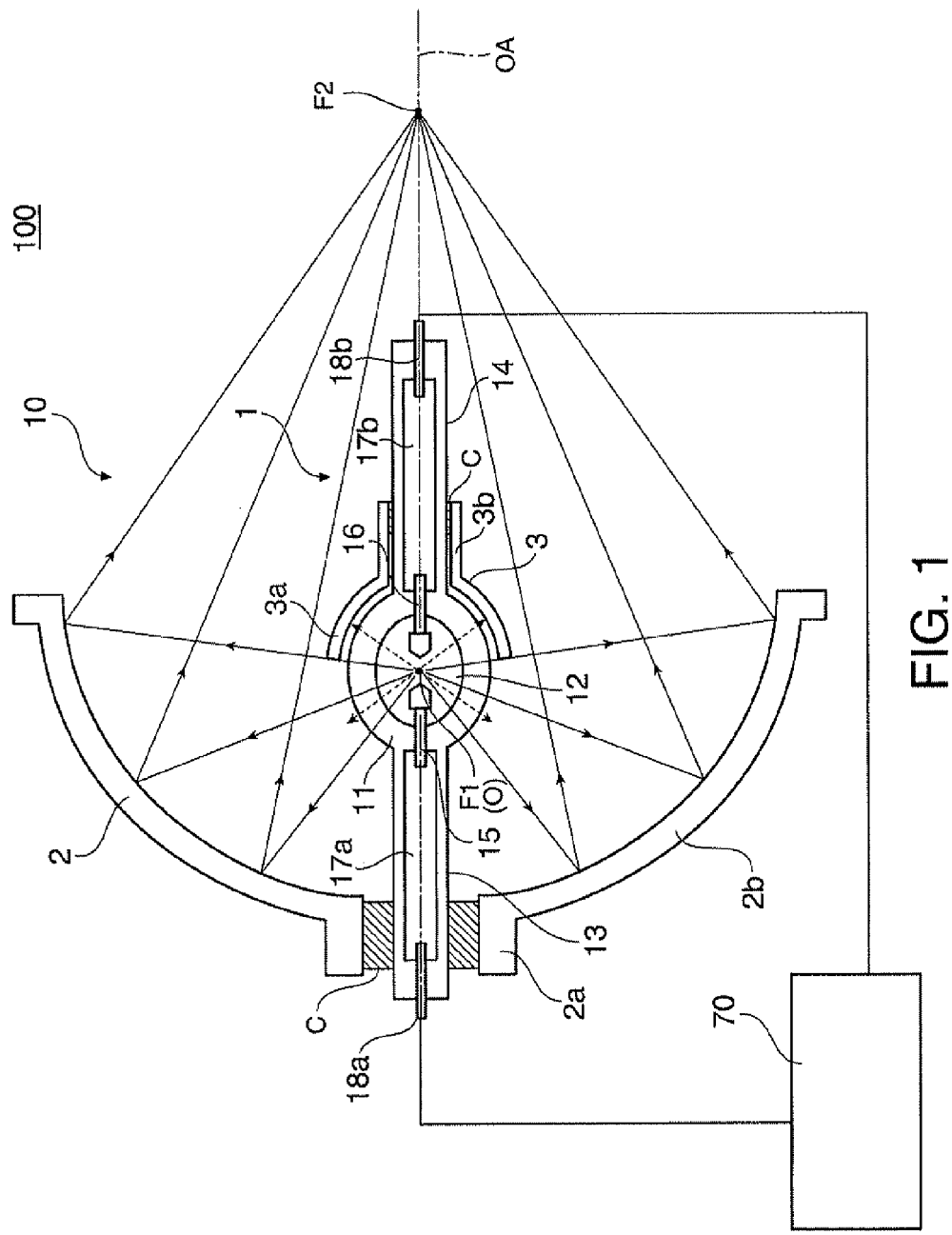
FIG. 1 is a sectional view for explaining a light source according to an embodiment of the invention.

FIG. 1 is a sectional view for conceptually explaining the structure of a light source 100. In the light source 100, a light source unit 10, which is a discharge lamp, has a discharge light emitting arc tube 1, a reflector 2, which is an elliptic main reflection mirror, and a sub-mirror 3, which is a spherical sub-reflection mirror. A light source driving device 70, which will be described in detail later, is an electric circuit for supplying an alternating current to the light source unit 10 so that the light source unit 10 emits light in a desired state.

In the light source unit 10, the arc tube 1 is formed by a transparent quartz glass tube with its central part spherically expanding. The arc tube 1 has a body part 11, which is a sealed unit that radiates illumination light, and first and second sealing parts 13 and 14 extending along an axial line passing through both ends of the body part 11.

In a discharge space 12 formed in the body part 11, a distal end part of a first electrode 15 made of tungsten and a distal end part of a second electrode 16 similarly made of tungsten are arranged at a predetermined distance from each others and a gas as a discharge medium including a rare gas, a metal halogen compound and the like is enclosed therein. Inside the sealing parts 13 and 14 extending to both ends of the body part 11, metal foils 17a and 17b of molybdenum electrically connected to base parts of the first and second electrodes 15 and 16 provided in the body part 11 are inserted. The two sealing parts 13 and 14 are airtightly sealed from outside by themselves or by a glass material or the like. When AC power is supplied by the light source driving device 70 to lead wires 18a and 18b connected to the metal foils 17a and 17b, arc discharge occurs between the pair of electrodes 15 and 16 and the body part 11 emits light with high luminance.

The sub-mirror 3 closely covers a substantially half part on the light exiting forward side where the second electrode 16 is situated, of the body part 11 of the arc tube 1. This sub-mirror 3 is an integrated molded product made of quartz glass. The sub-mirror 3 has a sub-reflection part 3a that returns a luminous flux radiated forward from the body part 11 of the arc tube 1, to the body part 11, and a supporting part 3b fixed to the periphery of the second sealing part 14 in the state of supporting the base part of the sub-reflection part 3a. The supporting part 3b allows the second sealing part 14 to be inserted therein and holds the sub-reflection part 3a in the state of being aligned with the body part 11. The sub-mirror 3 can be omitted in an application where the efficiency of utilization of light does not matter very much.

The reflector 2 is arranged to face a substantially half part on the light exiting rear side where the first electrode 15 is situated, of the body part 11 of the arc tube 1. The reflector 2 is an integrated molded product made of crystallized glass or quartz glass. The reflector 2 has a neck-like part 2a in which the first sealing part 13 of the arc tube 1 is inserted, and a main reflection part 2b in the shape of an elliptic curved surface expanding from the neck-like part 2a. The neck-like part 2a allows the first sealing part 13 to be inserted therein and holds the main reflection part 2b in the state of being aligned with the body part 11.

The arc tube 1 is arranged along a system optical axis OA corresponding to the rotational symmetry axis or the optical axis of the main reflection part 2b and is arranged in such a manner that the center of light emission O between the first and second electrodes 15 and 16 in the body part 11 coincides with the position of a first focal point F1 on the elliptic curved surface of the main reflection part 2b. When the arc tube 1 is lit, a luminous flux radiated from the arc on the periphery of the center of light emission O of the body part 11 is reflected by the main reflection part 2b, or is first reflected by the sub-reflection part 3a and further reflected by the main reflection part 2b, and becomes a luminous flux substantially converged to the position of a second focal point F2 on the elliptic curved surface. In short, the reflector 2 and the sub-mirror 3 have a reflection curved surface that is substantially axially symmetric to the system optical axis OA. The pair of electrodes 15 and 16 is arranged with their electrode axes, as their axial cores, substantially coinciding with the system optical axis OA.

The arc tube 1 is produced, for example, by supporting the electrodes 15 and 16 fixed to the distal ends of the metal foils 17a and 17b in a quartz glass tube, and then carrying out shrink seal, that is, heating, with a burner, the quartz glass tube at the parts corresponding to the two sealing parts 13 and 14 from the periphery and thus causing the quartz glass tube to soften and shrink. In the arc tube 1 thus produced, an inorganic adhesive C is injected into the neck-like part 2a of the reflector 2 having the first sealing part 13 inserted therein, and the neck-like part 2a is filled with the inorganic adhesive C, which is then solidified. Thus, the first sealing part 13 inserted in the neck-like part 2a is fixed. In the sub-mirror 3, the inorganic adhesive C is injected into the supporting part 3b having the second sealing part 14 of the arc tube 1 inserted therein, and the supporting part 3b is filled with the inorganic adhesive C, which is then solidified. Thus, the second sealing part 14 inserted in the supporting part 3b is fixed.

Figure 2:
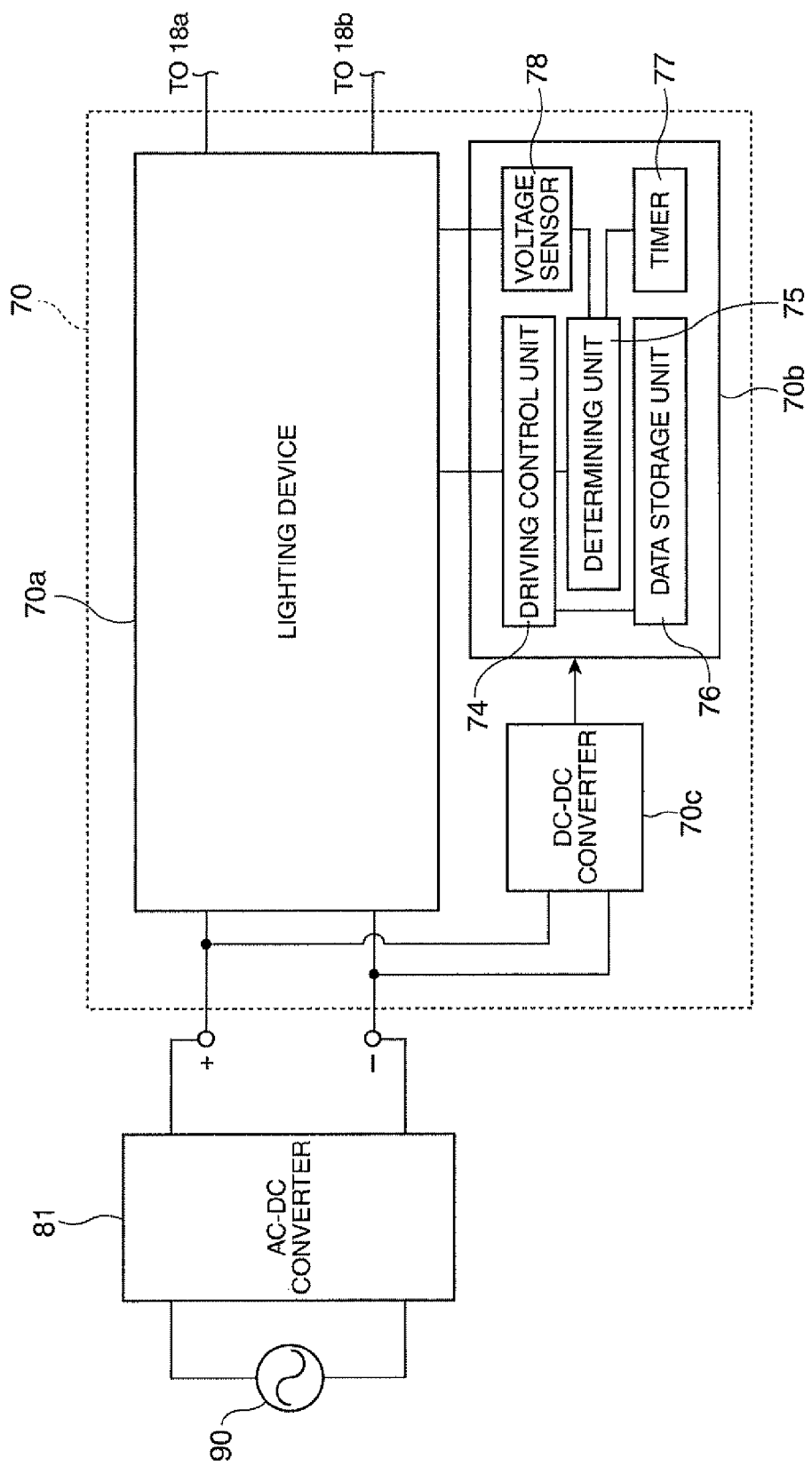
FIG. 2 is a block diagram showing the configuration of a current driving device incorporated in the light source.

FIG. 2 is a block diagram schematically showing the configuration of the light source driving device 70 for causing the lighting operation of the light source unit 10 shown in FIG. 1 in a desired state.

The light source driving device 70 generates an alternating current to cause discharge between the pair of electrodes 15 and 16 shown in FIG. 1 and the like and controls the supply state of the alternating current to the two electrodes 15 and 16. The light source driving device 70 has a lighting device 70a, a control device 70b, and a DC-DC converter 70c. Here, an example will be described in which the light source driving device 70 uses an external power source. That is, the light source driving device 70 is connected to an AC-DC converter 81. The AC-DC converter 81 is connected to a commercial power source 90. The AC-DC converter 81 converts an alternating current supplied from the commercial power source 90 to a direct current.

The lighting device 70a is a circuit part for performing lighting drive of the light source unit 10 of FIG. 1. The lighting device 70a adjusts the power supply pattern outputted from the light source driving device 70 to the light source unit 10. Here, the power supply pattern is defined by elements including amplitude, duty factor, positive-negative amplitude ratio, waveform characteristic, frequency or the like of an output current or voltage. A driving signal, that is, a power supply pattern having an arbitrary waveform, for example, a rectangular wave, or a superimposed wave formed by superimposing various waveforms such as triangle wave or sine wave onto a rectangular wave, is outputted from the lighting device 70a to the light source unit 10.

The control device 70b is a circuit unit including, for example, a microcomputer, a memory, a sensor, an interface and so on. The control device 70b is driven by a proper driving voltage generated by the DC-DC converter 70c as a power source. The control device 70b has a driving control unit 74 that controls the operating state of the lighting device 70a, a determining unit 75 that determines the state of the arc tube 1, and a data storage unit 76 that stores various information including the operation mode of the lighting device 70a, that is, power supply conditions. The control device 70b also has a timer 77 for measuring the cumulative lighting time of the arc tube 1, and a voltage sensor 78 that detects an applied voltage to the arc tube 1.

The driving control unit 74 is a unit that operates in accordance with a program stored in the data storage unit 76 and the like. In normal operation, the driving control unit 74 selects an initial power supply condition and a steady-state power supply condition that meet the current status of the arc tube 1, from those stored in the data storage unit 76. The driving control unit 74 causes the lighting device 70a to carry out an initial operation and a steady-state operation of general contents in accordance with the selected power supply conditions. The driving control unit 74, in cooperation with the lighting device 70a, functions as a driving unit for supplying power to the arc tube 1 and thus causing the arc tube 1 to perform lighting operation according to the status. In this embodiment, the initial operation refers to the operation until the arc tube 1 starts emitting light with sufficient luminance in the state where the electrified state between the electrodes 15 and 16 is stabilized. The steady-state operation refers to the operation after the arc tube 1 starts emitting light with sufficient luminance in the state where the electrified state between the electrodes 15 and 16 is stabilized.

The determining unit 75 is a unit that determines which level the cumulative lighting time of the arc tube 1 is at, which of deterioration stages of the arc tube 1 is now in question on the basis of the applied voltage to the arc tube 1 or its change value, and how far the distance between the two electrodes 15 and 16 is. The determining unit 75 can determine the deterioration stage of the arc tube 1 and the degree of the inter-electrode distance on the basis of the cumulative lighting time of the arc tube 1 or its increase value. The determining unit 75 also can determine the deterioration stage of the arc tube 1 and the degree of the inter-electrode distance on the basis of the supply current to the arc tube 1 or its change value. The determining unit 75 also can determine the deterioration stage of the arc tube 1 and the degree of the inter-electrode distance on the basis of illuminance of the arc tube 1 or its change value.

The data storage unit 76 stores operation programs of the driving control unit 74 and also stores plural initial power supply conditions as initial operation modes of the arc tube 1 and plural steady-state power supply conditions as steady-state operation modes of the arc tube 1. The former, that is, the initial power supply conditions include one or more initial power supply conditions, The latter, that is, the steady-state power supply conditions include one or more steady-state power supply conditions. Specifically, the data storage unit 76 stores set values such as current value and frequency at the time of start-up or boot-up included in the lighting drive in the initial operation. The data storage unit 76 also stores various parameters including current value, frequency, and type and size of a waveform to be superimposed on a fundamental wave such as a rectangular wave in the lighting drive in the steady-state operation.

The timer 77 checks the lighting time of the arc tube 1 and holds the cumulative lighting time acquired by accumulating the lighting time of each time. The voltage sensor 78 detects and holds the voltage applied between the first and second electrodes 15 and 16 of the arc tube 1 via the lighting device 70a.

Figure 3:
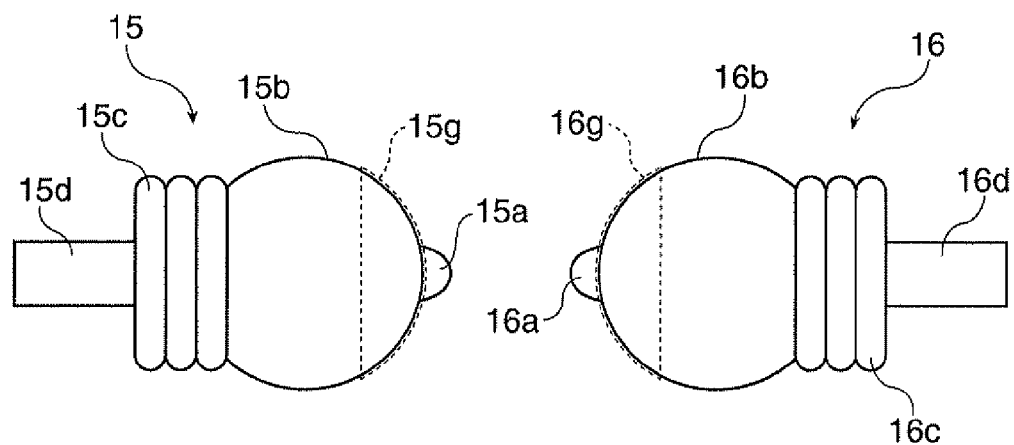
FIG. 3 is an enlarged view for explaining a distal end peripheral part of a pair of electrodes.

FIG. 3 is an enlarged view of the distal end parts of the first and second electrodes 15 and 16 enclosed in the arc tube 1. The first and second electrodes 15, 16 have protrusions 15a, 16a, body parts 15b, 16b, coil parts 15c, 16c, and core bars 15d, 16d, respectively. As the lump-like body parts 15b and 16b are provided at the distal end of the first and second electrodes 15 and 16, heat capacity can be increased. The distal end parts of the first and second electrodes 15 and 16 are formed, for example, by winding tungsten on the core bars 15d and 16d before being enclosed, and then heating and melting the tungsten. In this case, the remaining part that is not melted, of the wound tungsten, forms the coil parts 15c and 16c.

Figure 4A:
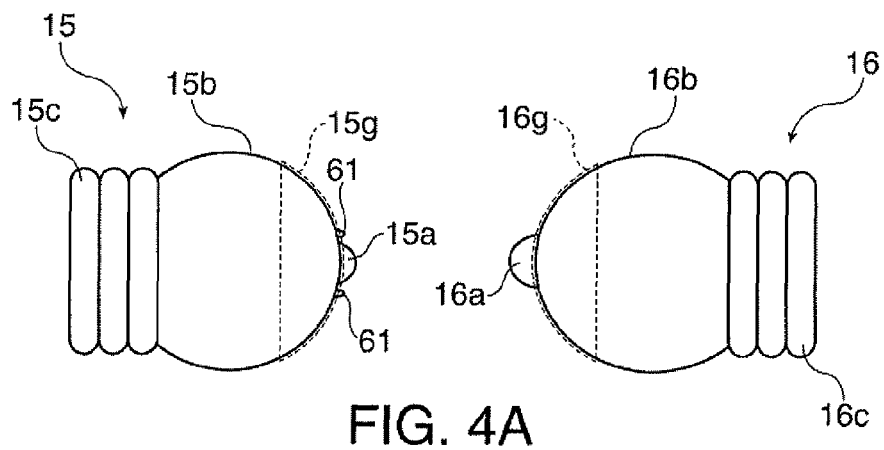
FIG. 4A to FIG. 4C are enlarged views for explaining repair of an electrode in the light source driving device.
Figure 4B:
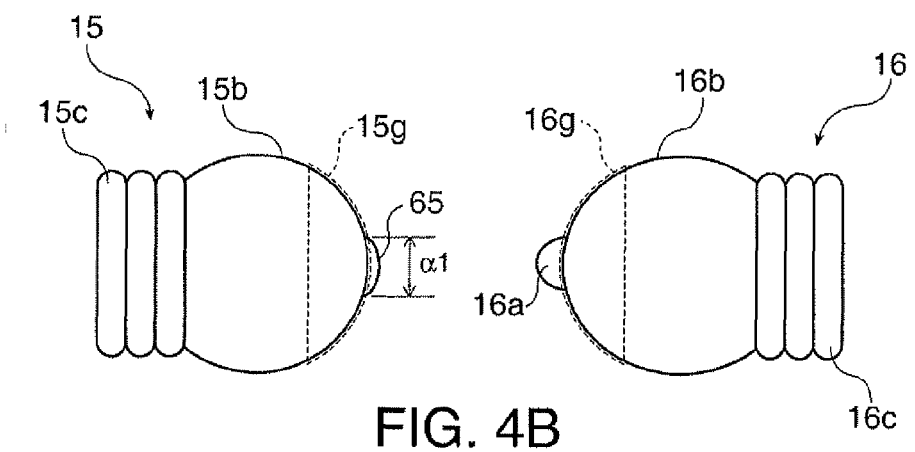
Figure 4C:
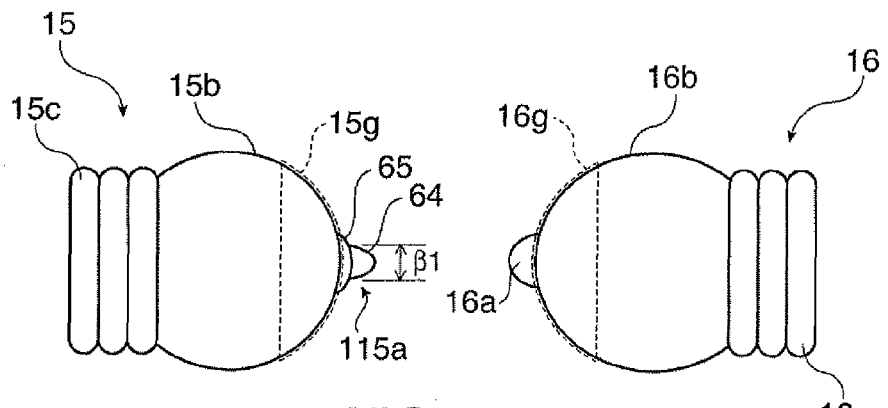

FIG. 4A to FIG. 4C are conceptual views for explaining the lighting operation of the first electrode 15, of the two electrodes 15 and 16. In the case of the first electrode 15 shown in FIG. 4A, the protrusion 15a is worn and reduced. The distance between the two electrodes 15 and 16 becomes longer and causes, for example, a phenomenon of lowered luminance of the arc and a phenomenon of changing light intake efficiency to the optical system on the subsequent stage. Also, for example, in a distal end area 15g on the periphery of the protrusion 15a, plural minute recesses and protrusions 61 are irregularly generated. Moreover, plural minute recesses and protrusions may be generated on the surface of the protrusion 15a. In such cases, shift of the discharge starting point between the protrusion 15a and the recesses and protrusion 61, that is, flickering and arc jump occur. Here, in flickering, shift of the discharge starting continuously occurs, in arc jump, the discharge starting point completely shifts from the position of the initial discharge starting point. Flickering causes a flicker of light. Arc jump lowers illuminance.

Even when the first electrode 15 deteriorates because of the wear or the like of the protrusion 15a as described above, if lighting drive under a proper steady-state power supply conditions is selected and executed in proper timing during the steady-state operation of the arc tube 1, the worn protrusion 15a is increased in size and the unwanted recesses and protrusions 61 are removed. In this case, the protrusion 15a is thickened on the base side and thinned on the distal end side, that is, to have a tapered shape. Thus, the shape stability of the protrusion 15a against heat and current improves. Not only the luminance of the arc can be increased but also light emission can be stabilized for a long period. As a power supply pattern used in the above lighting drive, a first lighting waveform having a maximum current value at a part other than a half-cycle rear end part of the waveform, a second lighting waveform having a maximum current value at the half-cycle rear end part of the waveform, and a combination of the first lighting waveform and the second lighting waveform can be considered. The first lighting waveform includes a rectangular wave having a constant current in a half-cycle. Here, the first lighting waveform tends to expand and flatten the protrusion 15a when reproducing the protrusion 15a and therefore contributes mainly to the formation of the base side of the protrusion 15a. The second lighting waveform tends to protrude the protrusion 15a in an elongated form when reproducing the protrusion 15a and therefore contributes mainly to the formation of the distal end side of the protrusion 15a. Thus, by adjusting the combination rate at which the first lighting waveform and the second lighting waveform are combined and the switching timing of the combination rate, it is possible to realize a desired shape of the protrusion 15a including the above tapered shape when reproducing the protrusion 15a. The combination rate of the first lighting waveform and the second lighting waveform can be arbitrarily adjusted, for example, by adjusting the ratio of the operating time of the first lighting waveform to the operating time of the second lighting waveform, specifically, by adjusting the supply ratio n/m, where the current of the first lighting waveform is supplied in n cycles while the current of the second lighting waveform is supplied in m cycles. The supply ratio n/m of the first and second lighting waveforms is usually 1 or less. This is because if the rate of the second lighting waveform is greater than the rate of the first lighting waveform, the tendency to restrain the reproduction of the protrusion 15a is usually strengthened excessively.

FIG. 43 is a view for explaining an example of formation of the base side of the protrusion 15a. FIG. 4B shows the result of lighting drive using a power supply pattern in which the combination rate of the second lighting waveform is relatively low. As can be seen from FIG. 4B, by adjustment of the power supply pattern, the original protrusion 15a can be gradually melted and grown from its surface, or the protrusion 15a can be re-grown after the original protrusion 15a is mostly melted. That is, the protrusion 15a can be deformed to be thick, and a large-diameter part 65 in the shape of a stable foundation can be formed which is to be the base part. The diameter $\alpha 1$ of this large-diameter part 65 on the side of the body part 15b is sufficiently larger than the original diameter.

FIG. 4C is a view for explaining an example of formation of the distal end side of the protrusion 15a. FIG. 4C shows the result of lighting drive using a power supply pattern in which the combination rate of the second lighting waveform is relatively high. As can be seen from FIG. 4C, by adjustment of the power supply pattern, a conical small-diameter part 64 to become a distal end part can be formed on the central part of the large-diameter part 65 shown in FIG. 43. The diameter $\beta 1$ of this small-diameter part 64 on the side of the body part 15b is sufficiently smaller than the diameter $\alpha 1$ of the large-diameter part 65. Consequently, a protrusion 115a formed by the large-diameter part 65 and the small-diameter part 64 is a roughly conical protuberance having a sufficiently thick base and tapered toward the distal end. Thus, since the tapered protrusion 115a having the sufficiently thick base can be largely reproduced, the luminance of the arc between the two electrodes 15 and 16 can be increased and the luminance of the arc tube 1 can be stabilized.

The above description is about the first electrode 15. However, similar lighting drive can be carried out for the second electrode 16. That is, if the use time becomes longer, the protrusion 16a on the second electrode 16 is gradually worn and reduced, or minute recesses and protrusions are formed on the periphery of the protrusion 16a. In this case, similar lighting drive to FIG. 4B and FIG. 4C is carried out in proper timing during the steady-state operation of the arc tube 1. The worn protrusion 16a is increased in size and unwanted recesses and protrusions are removed. Moreover, usually, growth or reproduction of the two electrodes 15 and 16 is carried out at the same time, instead of separately carrying growth or reproduction of the first electrode 15 and the second electrode 16. Thus, the stable tapered protrusions 15a and 16a having the sufficiently thick base can be largely reproduced at the same time. The luminance of the arc between the two electrodes 15 and 16 can be increased and the luminance of the arc tube 1 can be stabilized.

In the above description, lighting drive for growing or reproducing the two electrodes 15 and 16 is clearly separated between the formation of the base side (see FIG. 4B) and the formation of the distal end side (see FIG. 4C). However, in addition to completely separating the formation of the base side and the formation of the distal end side, it is also possible to gradually switch from the formation of the base side to the formation of the distal end side in three or more multiple stages. In this case, a power supply pattern is used in which the period of using the first lighting waveform is made relatively short as the inter-electrode distance between the first and second electrodes 15 and 16 becomes relatively short. This enables reproduction of the tapered protrusions 15a and 16a of the first and second electrodes 15 and 16 having a sufficiently large diameter on the base side.

Also, though the relation between the frequency of the first lighting waveform and the frequency of the second lighting waveform is not explained in the above description, the frequencies of the first and second lighting waveforms do need to be the same and the two lighting waveforms can be driven with different frequencies. Generally, for example, if the frequency of the first lighting waveform is relatively low, the tendency to heat the distal end side of the first and second electrodes 15 and 16 as a whole is strengthened. Therefore, relatively thick parts can be gradually formed when growing or reproducing the protrusions 15a and 16a. On the contrary, if the frequency of the first lighting waveform is relatively high, the tendency to heat the distal end side of the first and second electrodes 15 and 16 as a whole is weakened. Therefore, relatively thin parts can be quickly formed when growing or reproducing the protrusions 15a and 16a. Similarly, if the frequency of the second lighting waveform is relatively low, the tendency to heat the distal end side of the first and second electrodes 15 and 16 as a whole is strengthened. Therefore, relatively thick parts can be gradually formed when growing or reproducing the protrusions 15a and 16a. On the contrary, if the frequency of the second lighting waveform is relatively high, the tendency to heat the distal end side of the first and second electrodes 15 and 16 as a whole is weakened. Therefore, relatively thin parts can be quickly formed when growing or reproducing the protrusions 15a and 16a. That is, in order to grow or reproduce the well-tapered protrusions 15a and 16a, it is desirable to switch power supply patterns in such a manner that the frequency increases as the inter-electrode distance becomes relatively short, with respect to both the first and second lighting waveforms. Moreover, in order to make the most of the base forming function of the first lighting waveform and the distal end forming function of the second lighting waveform, generally, the frequency of the first lighting waveform should be equal to or lower than the frequency of the second lighting waveform. That is, since the first lighting waveform plays a major role in forming the large-diameter part 65 (see FIG. 4B) and the second lighting waveform plays a major role in forming the small-diameter part 64 (see FIG. 4C), the frequency of the first lighting waveform is generally equal to or lower than the frequency of the second lighting waveform.

FIG. 5A to FIG. 5D are conceptual views for explaining another lighting operation of the first electrode 15, of the two electrodes 15 and 16.

Figure 5A:
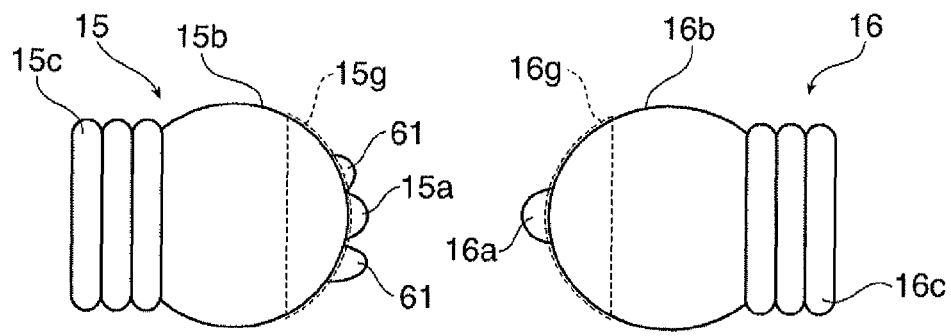
FIG. 5A to FIG. 5D are enlarged views for explaining restoration of an electrode in the light source driving device.

In the case of the first electrode 15 shown in FIG. 5A, an increase in the cumulative lighting time causes deterioration and a serious deterioration state sets in which requires fundamental restoration. Specifically, in the distal end area 15g of the body part 15b, plural recesses and protrusions 61 comparable in size to the protrusion 15a are irregularly generated. Also in this Case, shift of the discharge starting point between the protrusion 15a and the recesses and protrusions 61, that is, arc jump and flickering occur. When the first electrode 15 is deteriorated in this manner, melting drive as preprocessing shown in FIG. 5B and lighting drive for growth or restoration shown in FIG. 5C and FIG. 5D are selectively executed. Thus, the state of the first electrode 15 that is close to the state before deterioration can be recovered.

Figure 5B:
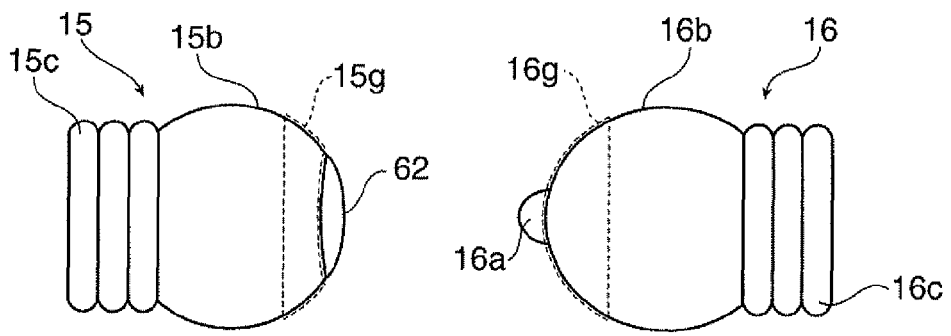
Figure 5C:
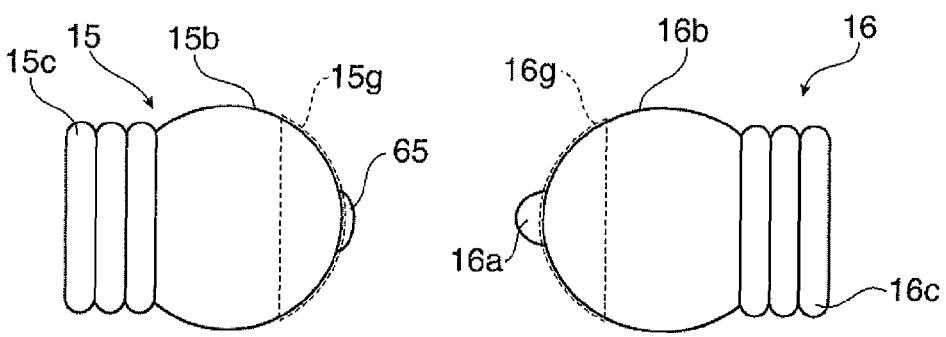
Figure 5D:
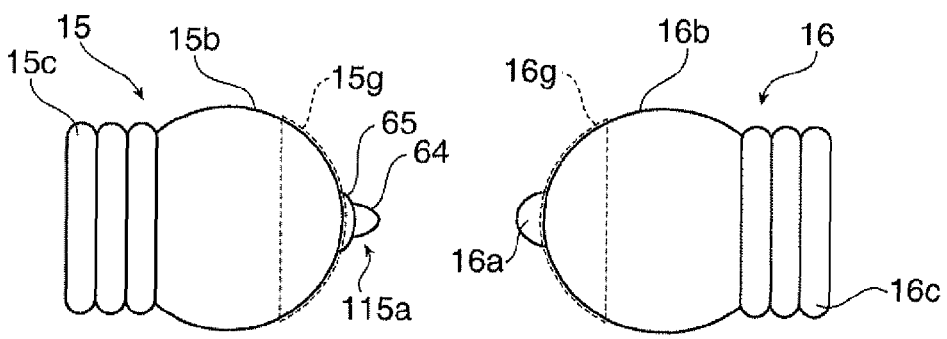

Specifically, as shown in FIG. 5B, melting drive is selected during the initial operation or the steady-state operation and lighting drive is carried out. Thus, the cumulative energy supplied and accumulated on the distal end side of the first electrode 15 increases, heating the protrusion 15a and its periphery. In the melting drive in this case, melting at a relatively high level is carried out. The recessed and protrusions 61 and the protrusion 15a formed on the distal end side of the first electrode 15 can be melted and smoothed, and a flatly expanding melting part 62 can be formed. After this melting driver the operation shifts to lighting drive for growth or restoration. As shown in FIG. 5C, as the power supply pattern supplied to the arc tube 1 is adjusted, lighting drive is carried out using a power supply pattern in which the combination rate of the second lighting waveform is relatively low, that is, formation of the base side is carried out. A large-diameter part 65 in the shape of a foundation to serve as a base part for growth or restoration is formed at the center on an end surface formed by solidifying the flat melting part 62 of FIG. 5B. Next, as shown in FIG. 5D, by adjusting the power supply pattern supplied to the arc tube 1, lighting drive is carried out using a power supply pattern in which the combination rate of the second lighting waveform is relatively high, that is, formation of the distal end side is carried out. A conical small-diameter part 64 to serve as a distal end part is formed on the central part of the large-diameter part 65 shown in FIG. 5C. The formation of the large-diameter part 65 shown in FIG. 5C is similar to the formation of the large-diameter part 65 shown in FIG. 4B. The formation of the small-diameter part 64 shown in FIG. 5D is similar to the formation of the small-diameter part 64 shown in FIG. 4C. That is, the combination rate at which the first lighting waveform and the second lighting waveform are combined, and the switching timing of this combination rate can be adjusted. In this case, it is also possible to gradually switch from the formation of the base side to the formation of the distal end side in three or more multiple stages. Moreover, the frequencies of the first and second lighting waveforms do not need to be the same from the formation of the base side to the formation of the distal end side. The two lighting waveforms can be driven with different frequencies.

The above description is about the first electrode 15. However, similar lighting drive can be carried out for the second electrode 16. That is, if the use time becomes longer, plural recesses and protrusions comparable in size to the protrusion 16a are irregularly formed in the distal end area of the second electrode 16. In this case, similar melting drive to FIG. 5B and similar lighting drive to FIG. 5C and FIG. 5D are carried out in proper timing during the steady-state operation of the arc tube 1. The worn protrusion 16a is increased in size and unwanted recesses and protrusions are removed. Moreover, usually, growth or restoration of the two electrodes 15 and 16 is carried out at the same time, instead of separately carrying growth or restoration of the first electrode 15 and the second electrode 16. Thus, the stable tapered protrusions 15a and 16a having the sufficiently thick base can be largely reproduced at the same time. The luminance of the arc between the two electrodes 15 and 16 can be increased and the luminance of the arc tube 1 can be stabilized.

Figure 6A:
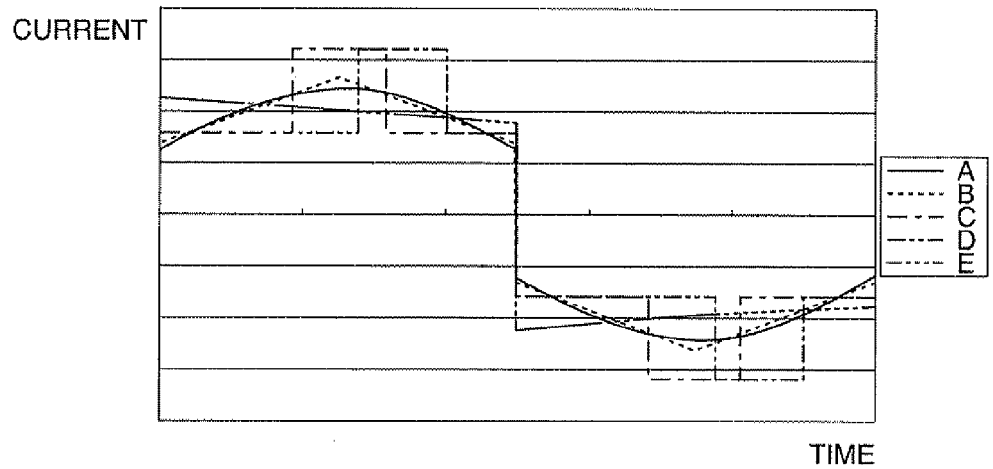

FIG. 6A is a graph showing an exemplary first lighting waveform. The horizontal axis represents time and the vertical axis represents current. In the graph, a waveform A (solid line) shows a sine wave-combined rectangular wave, in which a sine wave reaching the maximum at the center is combined with a rectangular wave during an anode period of the first electrode 15, that is, during an anode period in the left half of the graph. A waveform B (dotted line) shows a central triangle wave-combined rectangular wave, in which a central triangle wave reaching the maximum is combined with a rectangular wave. A waveform C (chain-dotted line) shows a central pulse-combined rectangular wave, in which a central pulse is combined with a rectangular wave. A waveform D (double chain-dotted lined) shows a mid-latter half pulse-combined rectangular wave, in which a mid-latter half pulse is combined with a rectangular wave. A waveform E (triple chain-dotted line) shows an inverse triangle wave-combined rectangular wave, in which a triangle wave reaching the maximum at the forward edge is combined with a rectangular wave. The above explanation is about the left half part of the graph, which is equivalent to the anode period of the first electrode 15. However, the same applies to the right half part of the graph, which is equivalent to the anode period of the second electrode 16. Similar power supply is carried out to the two electrodes 15 and 16. These waveforms A to E have a maximum current value at a part other than a half-cycle rear end with respect to the electrodes 15 and 16. The waveforms A to E have a relative tendency to expand and flatten the protrusions 15a and 16a when reproducing the protrusions 15a and 16a, and contribute mainly to the formation of the base side of the protrusions 15a and 16a, that is, the large-diameter part 65.

Figure 6B:
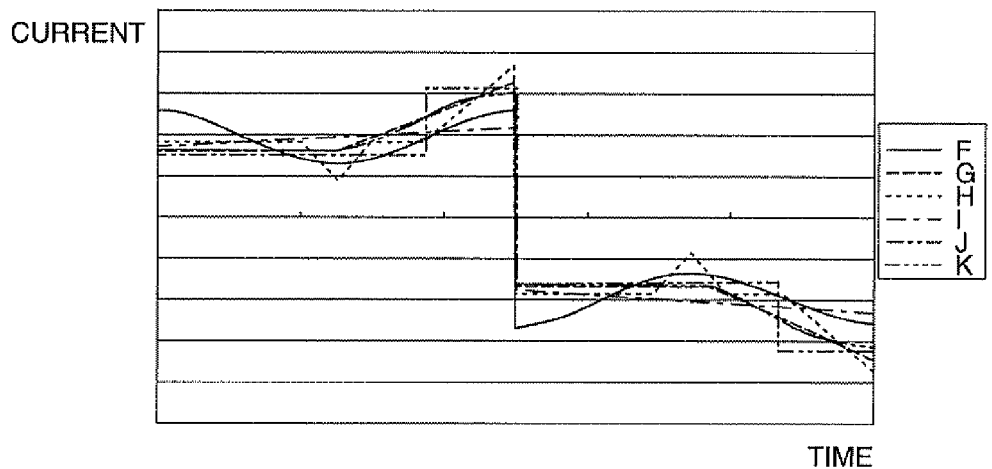

FIG. 6B is a graph showing an exemplary second lighting waveform. The horizontal axis represents time and the vertical axis represents current. In the graph, a waveform F (solid line) shows a cosine wave-combined rectangular wave, in which a cosine wave reaching the minimum at the center is combined with a rectangular wave during an anode period of the first electrode 15 shown in the left half of the graph. A waveform G (dotted line) shows a rear triangle wave-combined rectangular wave (type 1), in which a latter-half triangle wave reaching the maximum at the rear end is combined with a rectangular wave. A waveform H (broken line) shows a rear triangle wave-combined rectangular wave (type 2), in which two triangle waves reaching the minimum at the center and the maximum at the rear end is combined with a rectangular wave. A waveform I (chain-dotted lined) shows a rear triangle wave-combined rectangular wave (type 3), in which a triangle wave reaching the maximum at the rear end is combined with a rectangular wave. A waveform J (double chain-dotted line) shows a rear end pulse-combined rectangular wave, in which a rear end pulse is combined with a rectangular wave. A waveform K (triple chain-dotted line) shows a cosine wave-combined rectangular wave, in which a latter-half cosine wave reaching the maximum at the rear end is combined with a rectangular wave. The above explanation is about the left half part of the graph, which is equivalent to the anode period of the first electrode 15. However, the same applies to the right half part of the graph, which is equivalent to the anode period of the second electrode 16. Similar power supply is carried out to the two electrodes 15 and 16. These waveforms F to K have a maximum current value at the half-cycle rear end with respect to the electrodes 15 and 16. The waveforms F to K have a relative tendency to protrude the protrusions 15a and 16a in an elongated shape when reproducing the protrusions 15a and 16a, and contribute mainly to the formation of the distal end side of the protrusions 15a and 16a, that is, the small-diameter part 64.

Figure 7:
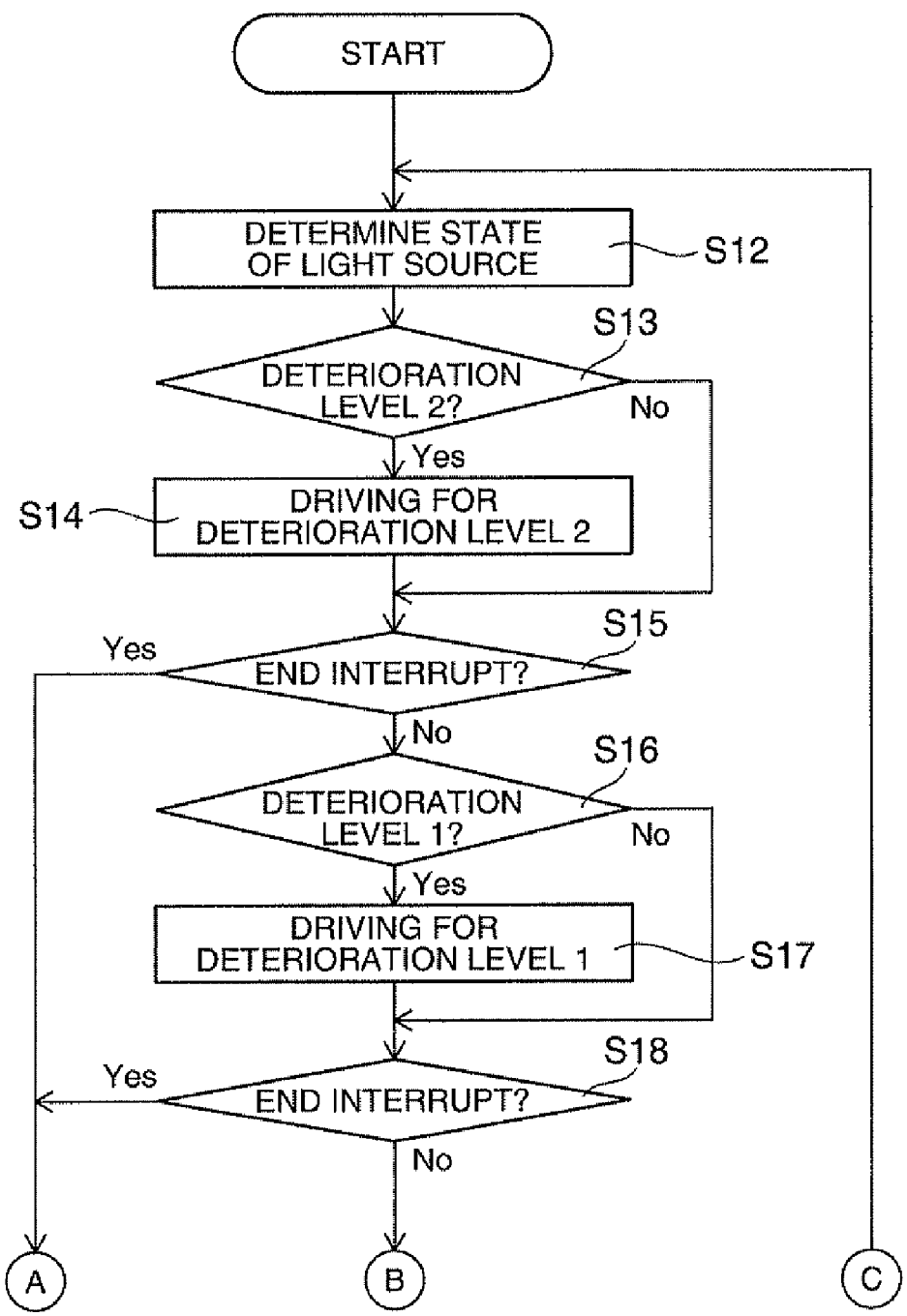
FIG. 7 is a flowchart (first half) for explaining the operation of the light source shown in FIG. 1, etc.
Figure 8:
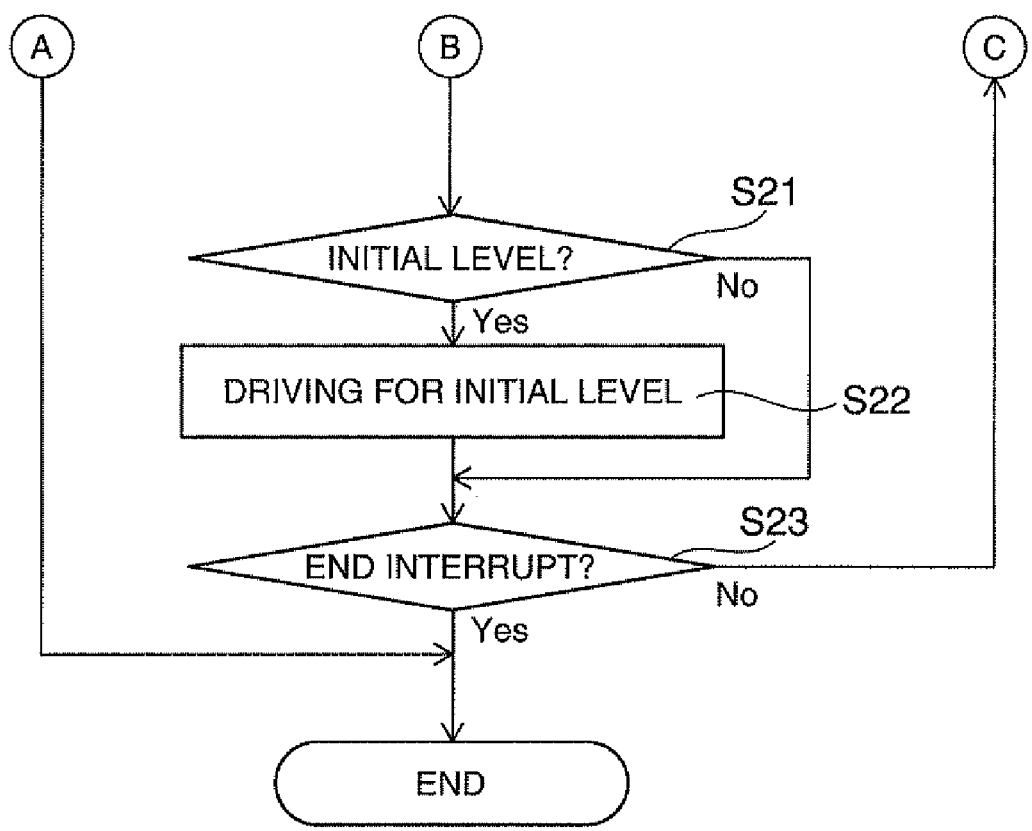
FIG. 8 is a flowchart (second half) for explaining the operation of the light source shown in FIG. 1, etc.

FIG. 7 and FIG. 8 are flowcharts for explaining the operation of the light source driving device 70. Although not shown for the purpose of simplification, it is assumed that the light source driving device 70 has already started its normal operation in response to a signal designating the start of lighting, has then completed an initial operation based on a standard initial driving power supply condition stored in the data storage unit 76 and has already started the steady-state operation based on a standard steady-state power supply condition stored in the data storage unit 76.

First, the determining unit 75 determines the state of the arc tube 1 (step S12). Specifically, for example, the cumulative lighting time of the arc tube 1 is checked. It is then determined which of ranked cumulative lighting time zones the provided result falls in. This information is stored into the data storage unit 76. Alternatively, for example, the supply voltage to the arc tube 1 is checked. It is then determined which of ranked voltage zones the provided result falls in. This information is stored into the data storage unit 76.

Next, the determining unit 75 determines whether the deterioration level of the arc tube 1 is the second stage or not, and outputs the result to the driving control unit 74 (step S13). The second stage of deterioration is equivalent to the state where the first electrode 15 and the second electrode 16 are significantly reduced in size (see FIG. 4A, etc.) and need growth or reproduction of the protrusions 15a and 16a. To determined whether the deterioration level is equivalent to such a state or not, the result of the determination in step S12 stored in the data storage unit 76 is used. Specifically, when the cumulative lighting time of the arc tube 1 reaches a predetermined high level or higher, or when the applied voltage to the arc tube 1 is at a predetermined high level or higher, it is determined that the deterioration level is the second stage where the distance between the two electrodes 15 and 16 is a predetermined distance or longer. It can be also be determined whether the deterioration level is the second stage or not, in accordance with the luminance of the light source or the like.

If it is determined in step S13 that the deterioration level is the second stage, data for lighting drive corresponding to the second stage of deterioration is selected from the data stored in the data storage unit 76, and the selected lighting drive is carried out by the lighting device 70a under the control of the driving control unit 74 (step S14). That is, of the plural steady-state power supply conditions stored in the data storage unit 76, a power supply pattern corresponding to the second stage of deterioration is used to carry out the lighting drive for reproduction shown in FIG. 4B. In this case, a power supply pattern formed by a combination of the exemplary first lighting waveform shown in FIG. 6A and the exemplary second lighting waveform shown in FIG. 6B is used. Moreover, in this case, by lighting drive with a power supply pattern in which the combination rate of the second lighting waveform is made relatively low, the foundation-like large-diameter part 65 is formed on the distal end side of the body parts 15b and 16b. Meanwhile, if it is not determined in step S13 that the deterioration level is the second stage, the lighting drive in step S14 is omitted.

Now, the driving control unit 74 confirms whether an interrupt request signal that requests ending of the lighting operation of the light source unit 10 is inputted or not (step S15). When such an interrupt request signal is inputted, the driving control unit 74 records the driving condition into the data storage unit 76 and shifts the operation to lights-out operation.

When there is no request for end interrupt, the determining unit 75 determines whether the deterioration level of the arc tube 1 is the first stage or not, and outputs the result to the driving control unit 74 (step S16). The first stage of deterioration is equivalent to the state where the first electrode 15 and the second electrode 16 are slightly deteriorated, including not only the case where the lighting time of the arc tube 1 is slightly increased and the deterioration is advanced to a certain extent, but also the case where the lighting drive in step S14 to recover from the second stage of deterioration is completed and the large-diameter part 65 as shown in FIG. 4B is formed. To determine whether the deterioration is equivalent to such states or not, the result of the determination in step S12 stored in the data storage unit 76 is used, as in the above step S13. Specifically, when the cumulative lighting time of the arc tube 1 reaches an intermediate level in a predetermined range, or when the applied voltage to the arc tube 1 is at an intermediate level in a predetermined range, it is determined that the deterioration level is the first stage where the distance between the two electrodes 15 and 16 is within a predetermined range. It can also be determined whether the deterioration level is the first stage or not, in accordance with the luminance of the light source or the like.

When it is determined in step S16 that the deterioration level is the first stage, data for lighting drive corresponding to the first stage of deterioration is selected from the data stored in the data storage unit 76, and the selected lighting drive is carried out by the lighting device 70a under the control of the driving control unit 74 (step S17). That is, of the plural steady-state power supply conditions stored in the data storage unit 76, a power supply pattern corresponding to the first stage of deterioration is used to carry out the lighting drive for reproduction shown in FIG. 4C. In this case, a power supply pattern formed by a combination of the exemplary first lighting waveform shown in FIG. 6A and the exemplary second lighting waveform shown in FIG. 6B is used. However, by lighting drive with a power supply pattern in which the combination rate of the second lighting waveform is relatively greater than in step S14, the small-diameter part 64 is formed on the large-diameter part 65 existing on the distal end side of the body parts 15b and 16b. Meanwhile, if it is not determined in step S16 that the deterioration level is the first stage, the lighting drive in step S17 is omitted.

Now, the driving control unit 74 confirms whether an interrupt request signal that requests ending of the lighting operation of the light source unit 10 is inputted or not (step S18). When such an interrupt request signal is inputted, the driving control unit 74 records the driving condition into the data storage unit 76 and shifts the operation to lights-out operation.

When there is no request for end interrupt, the determining unit 75 determines whether the deterioration of the arc tube 1 is on the initial level or not, and outputs the result to the driving control unit 74 (step S21). The initial level is equivalent to the state where the distance between the first electrode 15 and the second electrode 16 is as short as the initial distance, including not only the case where the lighting time of the arc tube 1 is short, but also the case where the lighting drive in step S17 to recover from the first stage of deterioration is completed and the protrusion 115a as shown in FIG. 4C is formed. To determine whether the deterioration is equivalent to such states or not, the result of the determination in step S12 stored in the data storage unit 76 is used, as in the above step S13. Specifically, when the cumulative lighting time of the arc tube 1 is at a predetermined low level or lower, or when the applied voltage to the arc tube 1 is at a predetermined low level or lower, it is determined that the deterioration level is the initial level where the distance between the two electrodes 15 and 16 is a predetermined distance or less. It can also be determined whether the deterioration level is the initial level or not, in accordance with the luminance of the light source or the like.

When it is determined in step S21 that the deterioration level is the initial level, data for lighting drive corresponding to the initial level is selected from the data stored in the data storage unit 76, and the selected lighting drive is carried out by the lighting device 70a under the control of the driving control unit 74 (step S22). Also in this case, for example, a power supply pattern formed by a combination of the exemplary first lighting waveform shown in FIG. 6A and the exemplary second lighting waveform shown in FIG. 6B is used, However, by lighting drive with a power supply pattern in which the combination rate of the second lighting waveform is made greater than in step S17, driving corresponding to the electrodes 15 and 16 on the initial level is carried out. Meanwhile, if it is not determined in step S21 that the deterioration level is the initial level, the lighting drive in step S22 is omitted. In step S22, not only the first lighting waveform and the second lighting waveform are combined, but also a driving waveform, for example, formed only by the first lighting waveform (specifically, a rectangular wave) or only by the second lighting waveform, can be supplied between the two electrodes 15 and 16 on the assumption that the growth of the protrusion 115a is completed.

Now, the driving control unit 74 confirms whether an interrupt request signal that requests ending of the lighting operation of the light source unit 10 is inputted or not (step S23). When such an interrupt request signal is inputted, the driving control unit 74 records the driving condition into the data storage unit 76 and shifts the operation to lights-out operation.

When it is confirmed by the driving control unit 74 in step S23 that an interrupt request signal that requests ending of the lighting operation of the light source unit 10 is not inputted, the control device 70b returns to step S12 and continues the lighting drive.

When it is determined in step S23 or the like that there is a request for end interrupt, the driving control unit 74 records information, indicating the current state of the arc tube 1 including the present cumulative lighting time and the voltage that is currently supplied to the arc tube 1, to the data storage unit 76, and shifts the operation to lights-out operation.

A specific example of the operation described with reference to FIG. 7 and FIG. 8 will be described. In step S13, it is determined whether the arc tube 1 is in the second stage of deterioration or not. In this case, whether the deterioration level is the second stage or not depends on, for example, whether the voltage between the two electrodes 15 and 16 is greater than 80 V and equal to or less than 85 V. In step S16, it is determined whether the arc tube 1 is in the first stage of deterioration or not. In this case, whether the deterioration level is the first stage or not depends on, for example, whether the voltage between the two electrodes 15 and 16 is greater than 75 V and equal to or less than 80 V. Moreover, in step S21, it is determined whether the arc tube 1 is at the initial level of deterioration or not. In this case, whether the deterioration level is the initial level or not depends on, for example, whether the voltage between the two electrodes 15 and 16 is equal to or less than 75 V.

The lighting drive corresponding to the second stage of deterioration, carried out in step S14, uses the central pulse-combined rectangular wave C of FIG. 6A as the first lighting waveform and the rear triangle wave-combined rectangular wave G of FIG. 6B as the second lighting waveform. The combination ratio, that is, the driving time ratio between the pulse-combined rectangular wave C and the rear triangle wave-combined rectangular wave G is 1:1, In this case, both the frequency of the first lighting waveform and the frequency of the second lighting waveform are 100 Hz and the first lighting waveform and the second lighting waveform are alternately outputted. This enables formation of the large-diameter part 65 with a sufficiently large size on the distal end side of the body parts 15b and 16b of the two electrodes 15 and 16.

The lighting drive corresponding to the first stage of deterioration, carried out in step S17, uses the central pulse-combined rectangular wave C of FIG. 6A as the first lighting waveform and the rear triangle wave-combined rectangular wave G of FIG. 6B as the second lighting waveform. The combination ratio, that is, the driving time ratio between the central pulse-combined rectangular wave C and the rear triangle wave-combined rectangular wave G is 1:6. In this case, both the frequency of the first lighting waveform and the frequency of the second lighting waveform are 100 Hz, and after the second lighting waveform is outputted six times, the first lighting waveform is outputted once. Thus, while driving with the first lighting waveform is carried out for a predetermined period, driving with the second lighting waveform is carried out over a period that is six times the predetermined period. This enables formation of the small-diameter parts 64 on the large-diameter part 65 existing on the distal end side of the body parts 15b and 16b of the two electrodes 15 and 16.

The lighting drive corresponding to the initial level of deterioration, carried out in step S22, uses the central pulse-combined rectangular wave C of FIG. 6A as the first lighting waveform and the rear triangle wave-combined rectangular wave G of FIG. 6B as the second lighting waveform. The combination ratio, that is, the driving time ratio between the central pulse-combined rectangular wave C and the rear triangle wave-combined rectangular wave G is 1:12. In this case, both the frequency of one first lighting waveform and the frequency of one second lighting waveform are 100 Hz, and after the second lighting waveform is outputted 12 times, the first lighting waveform is outputted once. Thus, while driving with the first lighting waveform is carried out for a predetermined period, driving with the second lighting waveform is carried out over a period that is 12 times the predetermined period. This enables the protrusion 115a on the two electrodes 15 and 16 to be finished into a sharp end shape.

Hereinafter, another exemplary operation will be described. Whether the arc tube 1 is in the second stage of deterioration or not, whether the arc tube 1 is in the first stage of deterioration or not, and whether the arc tube 1 is at the initial level of deterioration or not are determined similarly to the above specific example.

The lighting drive corresponding to the second stage of deterioration, carried out in step S14, uses the central pulse-combined rectangular wave C of FIG. 6A as the first lighting waveform and the rear triangle wave-combined rectangular wave G of FIG. 6B as the second lighting waveform. The combination ratio, that is, the driving time ratio between the central pulse-combined rectangular wave C and the rear triangle wave-combined rectangular wave G is 1:12. In this case, the frequency of the first lighting waveform is 80 Hz and the frequency of the second lighting waveform is 100 Hz. One first lighting waveform and plural corresponding second lighting waveforms are alternately outputted. Thus, while driving with the first lighting waveform is carried out for a predetermined period, driving with the second lighting waveform is carried out over a period that is 12 times the predetermined period. This enables formation of the large-diameter part 65 with a sufficiently large size on the distal end side of the body parts 15b and 16b of the two electrodes 15 and 16.

Also the lighting drive corresponding to the first stage of deterioration, carried out in step S17, uses the central pulse-combined rectangular wave C and the rear triangle wave-combined rectangular wave G. The combination ratio, that is, the driving time ratio between the two waves C and G is maintained at 1:12. In this case, the frequency of the first lighting waveform is 100 Hz and the frequency of the second lighting waveform is 400 Hz. One first lighting waveform and plural corresponding second lighting waveforms are alternately outputted. Thus, while driving with the first lighting waveform is carried out for a predetermined period, driving with the second lighting waveform is carried out over a period that is 12 times the predetermined period. This enables formation of the small-diameter parts 64 on the large-diameter part 65 existing on the distal end side of the body parts 15b and 16b of the two electrodes 15 and 16.

The lighting drive corresponding to the initial level of deterioration, carried out in step S22, only uses a rectangular wave. In this case, the frequency of the rectangular wave is 100 Hz. This enables the protrusion 115a on the two electrodes 15 and 16 to be finished into a sharp end shape.

As is clear from the above description, in the light source 100 according to this embodiment, the control device 70b drives the light source using a combination of the first lighting waveform having the maximum current value at a part other than the half-cycle rear end part (see FIG. 6A) and the second lighting waveform having the maximum current value at the half-cycle rear end part (see FIG. 6B). Therefore, the growing state of the protrusion formed on the distal end side of the electrodes can be adjusted by adjustment of the combination ratio of the first lighting waveform to the second lighting waveform. Moreover, in the light source 100 according to this embodiment, the control device 70b can determine that the electrode distance between the first electrode 15 and the second electrode 16 becomes longer, on the basis of the level of the applied voltage to the arc tube 1, the lighting time and so on. When the electrode distance becomes longer in this way, lighting drive is carried out using at least the first lighting waveform. Thus, the protrusion 115a having a stable shape with a sufficient thickness on the base side can be formed on the distal end side of the first electrode 15 and the second electrode 16.

In the exemplary operation shown in FIG. 7 and FIG. 8, the melting drive shown in FIG. 5B is not carried out. However, such melting drive can be carried out as part of the initial operation or steady-state operation before the lighting drive for reproduction corresponding to the second stage of deterioration in step S13.

Figure 9:
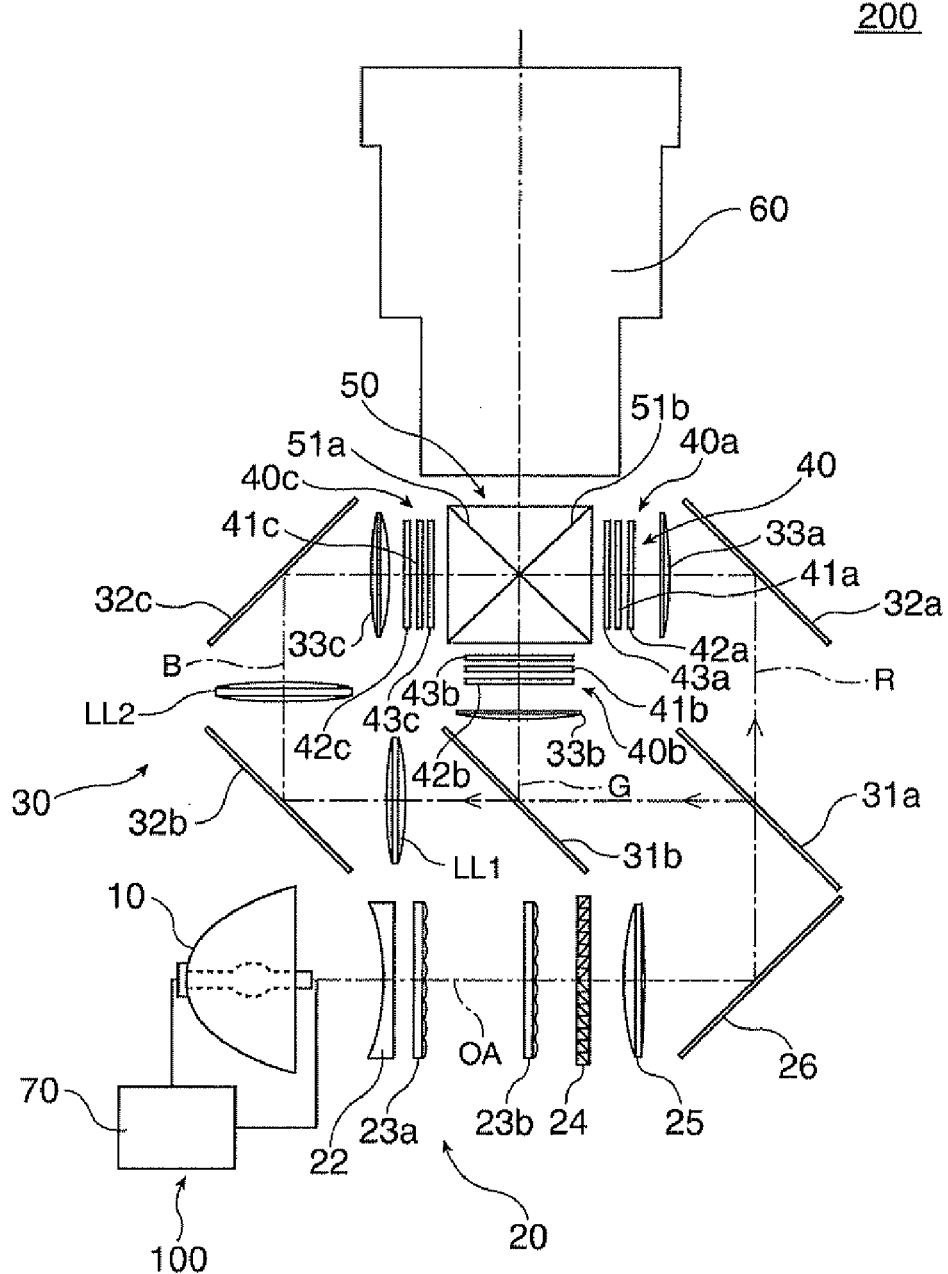
FIG. 9 is a view for explaining a projector having the light source incorporated therein.

FIG. 9 is a conceptual view for explaining the structure of a projector in which the light source 100 of FIG. 1 is incorporated. A projector 200 has the light source 100, an illumination system 20, a color separation system 30, a light modulator 40, a cross dichroic prism 50, and a projection lens 60. The light modulator 40 includes three liquid crystal light valves 40a, 40b and 40c having the same structure.

In the projector 200, the light source 100 has the light source unit 10 shown in FIG. 1 and the light source driving device 70. The light source 100 generates illumination light to illuminate the light modulator 40, that is, the liquid crystal light valves 40a, 40b and 40c via the illumination system 20 and the like.

The illumination system 20 has a parallelizing lens 22 that parallelizes the luminous flux direction of light source light, first and second fly-eye lenses 23a and 23b forming an optical integration system for dividing and superimposing light, a polarization conversion element 24 that aligns the direction of polarization of light, a superimposing lens 25 that superimposes light passing through the two fly-eye lenses 23a and 23b, and a mirror 26 that bends the optical path of light. Using these units, the illumination system 20 forms illumination light that is uniform and substantially white. In the illumination system 20, the parallelizing lens 22 converts the luminous flux direction of illumination light that exits the light source unit 10, into substantially parallel directions. Each of the first and second fly-eye lenses 23a and 23b includes plural element lenses arranged in a matrix form. The light passing through the parallelizing lens 22 is divided and separately condensed by the element lenses forming the first fly-eye lens 23a. The divided luminous fluxes from the first fly-eye lens 23a are caused to exit at a proper divergent angle by the element lenses forming the second fly-eye lens 23b. The polarization conversion element 24 is formed by an array including PBS, a mirror, a retardation film and so on, as a set of elements. The polarization conversion element 24 has the function of aligning the direction of polarization of each partial luminous flux divided by the first fly-eye lens 23a, into a single direction of linear polarization. The superimposing lens 25 properly converges the illumination light passing through the polarization conversion element 24, as a whole, and enables superimposed illumination to an illumination target area on the liquid crystal light valves 40a, 40b and 40c, which are light modulating devices for each color on the subsequent stage.

The color separation system 30 has first and second dichroic mirrors 31a and 31b, reflection mirrors 32a, 32b and 32c, and three field lenses 33a, 33b and 33c. The color separation system 30 separates illumination light that is made uniform by the illumination system 20 into three colors of red (R), green (G) and blue (B), and guides light of each color to the liquid crystal light valves 40a, 40b and 40c on the subsequent stage. More specifically, first, the first dichroic mirror 31a transmits the R light, of the three colors R, G and B, and reflects the G light and B light. The second dichroic mirror 31b reflects the G light, of the two colors G and B, and transmits the B light. Next, in this color separation system 30, the R light transmitted through the first dichroic mirror 31a becomes incident on the field lens 33a for adjusting the incident angle, via the reflection mirror 32a, The G light reflected by the first dichroic mirror 31a and further reflected by the second dichroic mirror 31b becomes incident on the field lens 33b for adjusting the incident angle. The B light transmitted through the second dichroic mirror 31b becomes incident on the field lens 33c for adjusting the incident angle, via relay lenses LL1 and LL2 and the reflection mirrors 32b and 32c.

Each of the liquid crystal light valves 40a, 40b and 40c forming the light modulator 40 is a non-light emitting light modulating device that modulates the spatial intensity distribution of incident illumination light. The liquid crystal light valves 40a, 40b and 40c have three liquid crystal panels 41a, 41b and 41c illuminated by the light of the corresponding colors that exit the color separation system 30, three first polarization filters 42a, 42b and 42c arranged on the light incident side of the liquid crystal panels 41a, 41b and 41c, respectively, and three second polarization filters 43a, 43b and 43c arranged on the light exiting side of the liquid crystal panels 41a, 41b and 41c, respectively. The R light transmitted through the first dichroic mirror 31a becomes incident on the liquid crystal light valve 40a via the field lens 33a and the like, and illuminates the liquid crystal panel 41a of the liquid crystal light valve 40a. The G light reflected by both the first and second dichroic mirrors 31a and 31b becomes incident on the liquid crystal light valve 40b via the field lens 33b and the like, and illuminates the liquid crystal panel 41b of the liquid crystal light valve 40b. The B light reflected by the first dichroic mirror 31a and transmitted through the second dichroic mirror 31b becomes incident on the liquid crystal light valve 40c via the field lens 33c and the like, and illuminates the liquid crystal panel 41c of the liquid crystal light valve 40c. The liquid crystal panels 41a to 41c modulate the spatial intensity distribution in the direction of polarization of the incident illumination light. The light of the three colors incident on the liquid crystal panels 41a to 41c, respectively, has its polarization state adjusted on the pixel basis in accordance with a driving signal or an image signal inputted as an electric signal to the liquid crystal panels 41a to 41c. In this case, the direction of polarization of the illumination light incident on the liquid crystal panels 41a to 41c is adjusted by the first polarization filters 42a to 42c, and modulated light in a predetermined direction of polarization is taken out by the second polarization filters 43a to 43c from the modulated light that exits the liquid crystal panels 41a to 41c. By this, the liquid crystal light valves 40a, 40b and 40c form image light of their respective corresponding colors.

The cross dichroic prism 50 combines the image light of each color from the liquid crystal light valves 40a, 40b and 40c. More specifically, the cross dichroic prism 50 is formed by bonding four right-angled prisms and has a substantially square shape in a plan view. On the interfaces of the bonded right-angled prisms, a pair of dielectric multilayer films 51a and 51b crossing each other in an X-shape is formed. The first dielectric multilayer film 51a reflects the R light. The second dielectric multilayer film 51b reflects the B light. In the cross dichroic prism 50, the R light from the liquid crystal light valve 40a is reflected by the dielectric multilayer film 51a and caused to exit to the right of the traveling direction. The G light from the liquid crystal light valve 40b is caused to travel straightforward and exit via the dielectric multilayer films 51a and 51b. The B light from the liquid crystal light valve 40c is reflected by the dielectric multilayer film 51b and caused to exit to the left of the traveling direction. In this way, the R light, G light and B light are combined by the cross dichroic prism 50 and combined light as image light based on a color image is formed.

The projection lens 60 is a projection system. The projection lens 60 magnifies, with a desired magnifying power, the image light formed by the combined light that is formed through the cross dichroic prism 50, and projects a color image onto a screen (not shown).

Second Embodiment

Hereinafter, a light source according to a second embodiment will be described. The light source of the second embodiment is a modification of the light source 100 of the first embodiment and is similar to the light source 100 of the first embodiment except for the parts particularly explained below.

Figure 10:
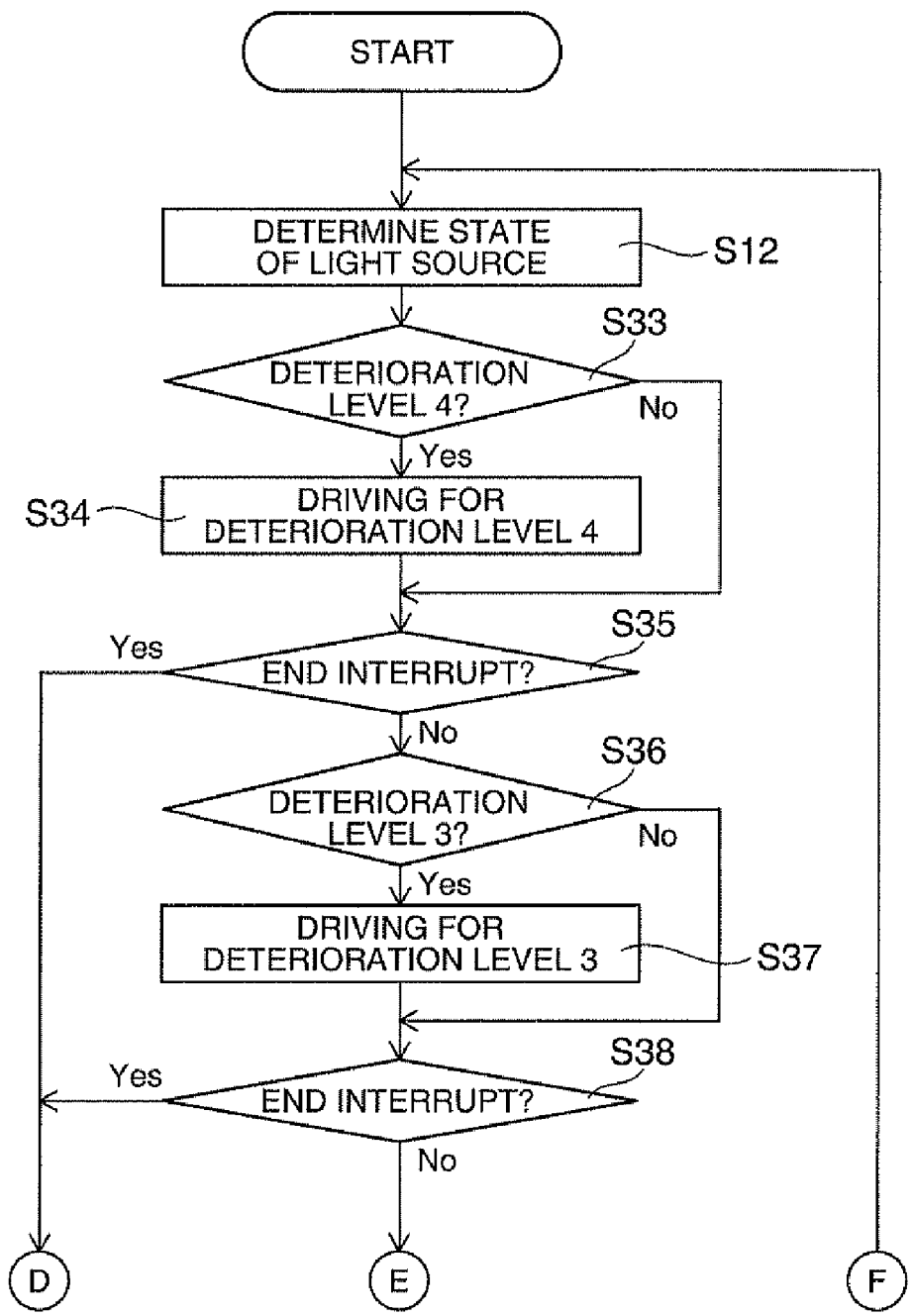
FIG. 10 is a flowchart (first half) for explaining the operation of a light source according to a second embodiment.
Figure 11:
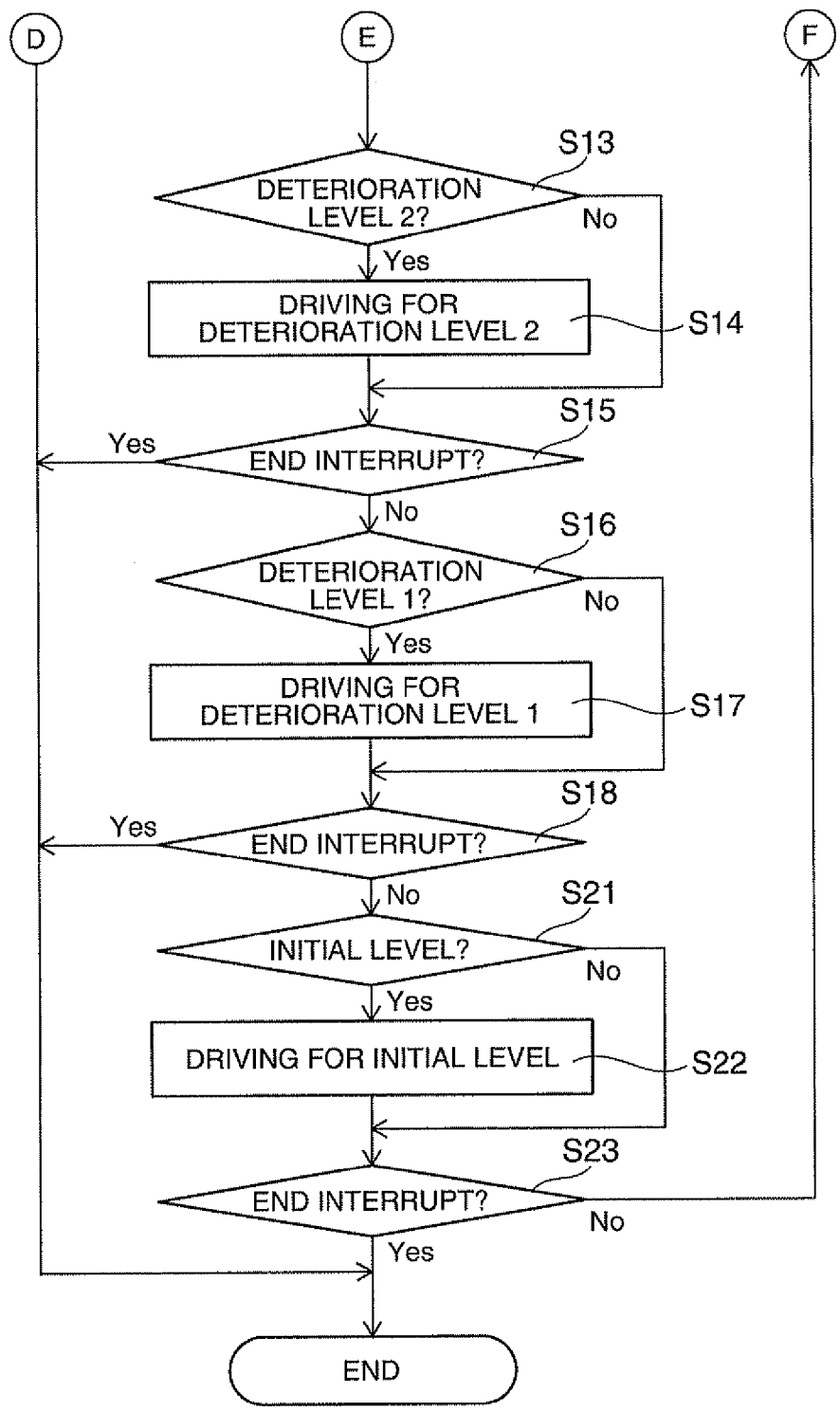
FIG. 11 is a flowchart (second half) for explaining the operation of the light source according to the second embodiment.

FIG. 10 and FIG. 11 are flowcharts for explaining the operation of the light source driving device 70. First, the determining unit 75 determines the state of the arc tube 1 (step S12).

Next, the determining unit 75 determines whether the deterioration level of the arc tube 1 is the fourth stage or not, and outputs the result to the driving control unit 74 (step S33). The fourth stage of deterioration is a more serious deterioration level than the second stage of deterioration described with reference to FIG. 7 in the first embodiment. The fourth stage of deterioration is equivalent to the state where the inter-electrode distance between the first electrode 15 and the second electrode 16 is extremely long. To determined whether the deterioration level is equivalent to such a state or not, the result of the determination in step S12 stored in the data storage unit 76, specifically, the level of the applied voltage to the arc tube 1, the lighting time and the like can be used.

If it is determined in step S33 that the deterioration level is the fourth stage, data for lighting drive corresponding to the fourth stage of deterioration is selected from the data stored in the data storage unit 76, and the selected lighting drive is carried out by the lighting device 70a under the control of the driving control unit 74 (step S34). In this case, a power supply pattern formed by a combination of the exemplary first lighting waveform shown in FIG. 6A and the exemplary second lighting waveform shown in FIG. 6B is used. However, by lighting drive with a power supply pattern having the lowest combination rate of the second lighting waveform, for example, a bottom half of the large-diameter part 65 is formed on the distal end side of the body parts 15b and 16b. Meanwhile, if it is not determined in step S33 that the deterioration level is the fourth stage, the lighting drive in step S34 is omitted.

Now, the driving control unit 74 confirms whether an interrupt request signal that requests ending of the lighting operation of the light source unit 10 is inputted or not (step S35). When such an interrupt request signal is inputted, the driving control unit 74 records the driving condition into the data storage unit 76 and shifts the operation to lights-out operation.

When there is no request for end interrupt, the determining unit 75 determines whether the deterioration level of the arc tube 1 is the third stage or not, and outputs the result to the driving control unit 74 (step S36). The third stage of deterioration is more advanced than the second stage of deterioration described with reference to FIG. 7 in the first embodiment, but it is not as serious as the fourth stage of deterioration in step S33. The third stage of deterioration is equivalent to the state where the inter-electrode distance between the first electrode 15 and the second electrode 16 is relatively long. To determine whether the deterioration is equivalent to such a state or not, the result of the determination in step S12 stored in the data storage unit 76, specifically, the level of the applied voltage to the arc tube 1, the lighting time and the like can be used.

When it is determined in step S36 that the deterioration level is the third stage, data for lighting drive corresponding to the third stage of deterioration is selected from the data stored in the data storage unit 76, and the selected lighting drive is carried out by the lighting device 70a under the control of the driving control unit 74 (step S37). In this case, a power supply pattern formed by a combination of the exemplary first lighting waveform shown in FIG. 6A and the exemplary second lighting waveform shown in FIG. 6B is used. However, by lighting drive with a power supply pattern in which the combination rate of the second lighting waveform is relatively greater than in step S34, for example, a top half of the large-diameter part 65 is formed on the distal end side of the body parts 15b and 16b. Meanwhile, if it is not determined in step S36 that the deterioration level is the third stage, the lighting drive in step S37 is omitted.

Now, the driving control unit 74 confirms whether an interrupt request signal that requests ending of the lighting operation of the light source unit 10 is inputted or not (step S38). When such an interrupt request signal is inputted, the driving control unit 74 records the driving condition into the data storage unit 76 and shifts the operation to lights-out operation.

When there is no request for end interrupt, the determining unit 75 determines whether the deterioration level of the arc tube 1 is the second stage or not, and outputs the result to the driving control unit 74 (step S13). The second stage of deterioration is equivalent to the second stage of deterioration described with reference to FIG. 7 in the first embodiment. To determine whether the deterioration is equivalent to such a state or not, the result of the determination in step S12 stored in the data storage unit 76, specifically, the level of the applied voltage to the arc tube 1, the lighting time and so on can be used.

When it is determined in step S13 that the deterioration level is the second stage, data for lighting drive corresponding to the second stage of deterioration is selected from the data stored in the data storage unit 76, and the selected lighting drive is carried out by the lighting device 70a under the control of the driving control unit 74 (step S14). In this case, a power supply pattern formed by a combination of the exemplary first lighting waveform shown in FIG. 6A and the exemplary second lighting waveform shown in FIG. 6B is used. However, by lighting drive with a power supply pattern in which the frequency of the second lighting waveform is made higher than in step S37, for example, a bottom half of the small-diameter part 64 is formed on the large-diameter part 65 existing on the distal end side of the body parts 15b and 16b. Meanwhile, if it is not determined in step S13 that the deterioration level is the second stage, the lighting drive in step S14 is omitted.

Now, the driving control unit 74 confirms whether an interrupt request signal that requests ending of the lighting operation of the light source unit 10 is inputted or not (step S15).

When such an interrupt request signal is inputted, the driving control unit 74 records the driving condition into the data storage unit 76 and shifts the operation to lights-out operation.

When there is no request for end interrupt, the determining unit 75 determines whether the deterioration level of the arc tube 1 is the first stage or not, and outputs the result to the driving control unit 74 (step S16). The first stage of deterioration is equivalent to the first stage of deterioration described with reference to FIG. 7 in the first embodiment. To determine whether the deterioration is equivalent to such a state or not, the result of the determination in step S12 stored in the data storage unit 76, specifically, the level of the applied voltage to the arc tube 1, the lighting time and so on can be used.

When it is determined in step S16 that the deterioration level is the first stage, data for lighting drive corresponding to the first stage of deterioration is selected from the data stored in the data storage unit 76, and the selected lighting drive is carried out by the lighting device 70a under the control of the driving control unit 74 (step S17). In this case, a power supply pattern formed by a combination of the exemplary first lighting waveform shown in FIG. 6A and the exemplary second lighting waveform shown in FIG. 6B is used. However, by lighting drive with a power supply pattern in which the frequency of the second lighting waveform is made higher than in step S14, for example, a top half of the small-diameter part 64 on the large-diameter part 65 existing on the distal end side of the body parts 15b and 16b is formed. Meanwhile, if it is not determined in step S16 that the deterioration level is the first stage, the lighting drive in step S17 is omitted.

Now, the driving control unit 74 confirms whether an interrupt request signal that requests ending of the lighting operation of the light source unit 10 is inputted or not (step S18). When such an interrupt request signal is inputted, the driving control unit 74 records the driving condition into the data storage unit 76 and shifts the operation to lights-out operation.

The processing in steps S21 to S23 is similar to the specific example of the first embodiment shown in FIG. 8 and therefore will not be described further in detail.

A specific example of the operation described with reference to FIG. 10 and FIG. 11 will be described In step S33, it is determined whether the arc tube 1 is in the fourth stage of deterioration or not. In this case, whether the deterioration level is the fourth stage or not depends on, for example, whether the voltage between the two electrodes 15 and 16 is greater than 90 V and equal to or less than 95 V. In step S36, it is determined whether the arc tube 1 is in the third stage of deterioration or not. In this case, whether the deterioration level is the third stage or not depends on, for example, whether the voltage between the two electrodes 15 and 16 is greater than 85 V and equal to or less than 90 V. The second stage of deterioration corresponds to the case where, for example, the voltage between the two electrodes 15 and 16 is greater than 80 V and equal to or less than 85 V. The first stage of deterioration corresponds to the case where, for example, the voltage between the two electrodes 15 and 16 is greater than 75 V and equal to or less than 80 V. The initial level corresponds to the case where, for example, the voltage between the two electrodes 15 and 16 is equal to or less than 75 V.

The lighting drive corresponding to the fourth stage of deterioration, carried out in step S33, uses the central pulse-combined rectangular wave C and the rear triangle wave-combined rectangular wave G. The combination ratio, that is, the driving time ratio between the central pulse-combined rectangular wave C and the rear triangle wave-combined rectangular wave G is 1:1. In this case, both the frequency of the first lighting waveform and the frequency of the second lighting waveform are 100 Hz. The first lighting waveform and the second lighting waveform are alternately outputted.

Also the lighting drive corresponding to the third stage of deterioration, carried out in step S37, uses the central pulse-combined rectangular wave C and the rear triangle wave-combined rectangular wave G. The combination ratio, that is, the driving time ratio between the central pulse-combined rectangular wave C and the rear triangle wave-combined rectangular wave G is 1:12. In this case, both the frequency of the first lighting waveform and the frequency of the second lighting waveform are 100 Hz. One first lighting waveform and corresponding plural second lighting waveforms are alternately outputted. Thus, while driving with the first lighting waveform is carried out for a predetermined period, driving with the second lighting waveform is carried out over a period that is 12 times the predetermined period.

Also the lighting drive corresponding to the second stage of deterioration, carried out in step S14, uses the central pulse-combined rectangular wave C and the rear triangle wave-combined rectangular wave G. The combination ratio, that is, the driving time ratio between the central pulse-combined rectangular wave C and the rear triangle wave-combined rectangular wave G is 1:12. In this case, the frequency of the first lighting waveform is 100 Hz and the frequency of the second lighting waveform is 200 Hz. One first lighting waveform and corresponding plural second lighting waveforms are alternately outputted. Thus, while driving with the first lighting waveform is carried out for a predetermined period, driving with the second lighting waveform is carried out over a period that is 12 times the predetermined period.

Also the lighting drive corresponding to the first stage of deterioration, carried out in step S17, uses the central pulse-combined rectangular wave C and the rear triangle wave-combined rectangular wave G. The combination ratio, that is, the driving time ratio between the central pulse-combined rectangular wave C and the rear triangle wave-combined rectangular wave G is 1:12. In this case, the frequency of the first lighting waveform is 100 Hz and the frequency of the second lighting waveform is 400 Hz, One first lighting waveform and corresponding plural second lighting waveforms are alternately outputted. Thus, while driving with the first lighting waveform is carried out for a predetermined period, driving with the second lighting waveform is carried out over a period that is 12 times the predetermined period.

The lighting drive corresponding to the initial level of deterioration, carried out in step S22, only uses a rectangular wave. In this case, the frequency of the rectangular wave is 100 Hz.

Third Embodiment

Hereinafter, a light source according to a third embodiment will be described. The light source of the third embodiment is a modification of the light source 100 of the first embodiment and is similar to the light source 100 of the first embodiment except for the parts particularly described below.

Figure 12:
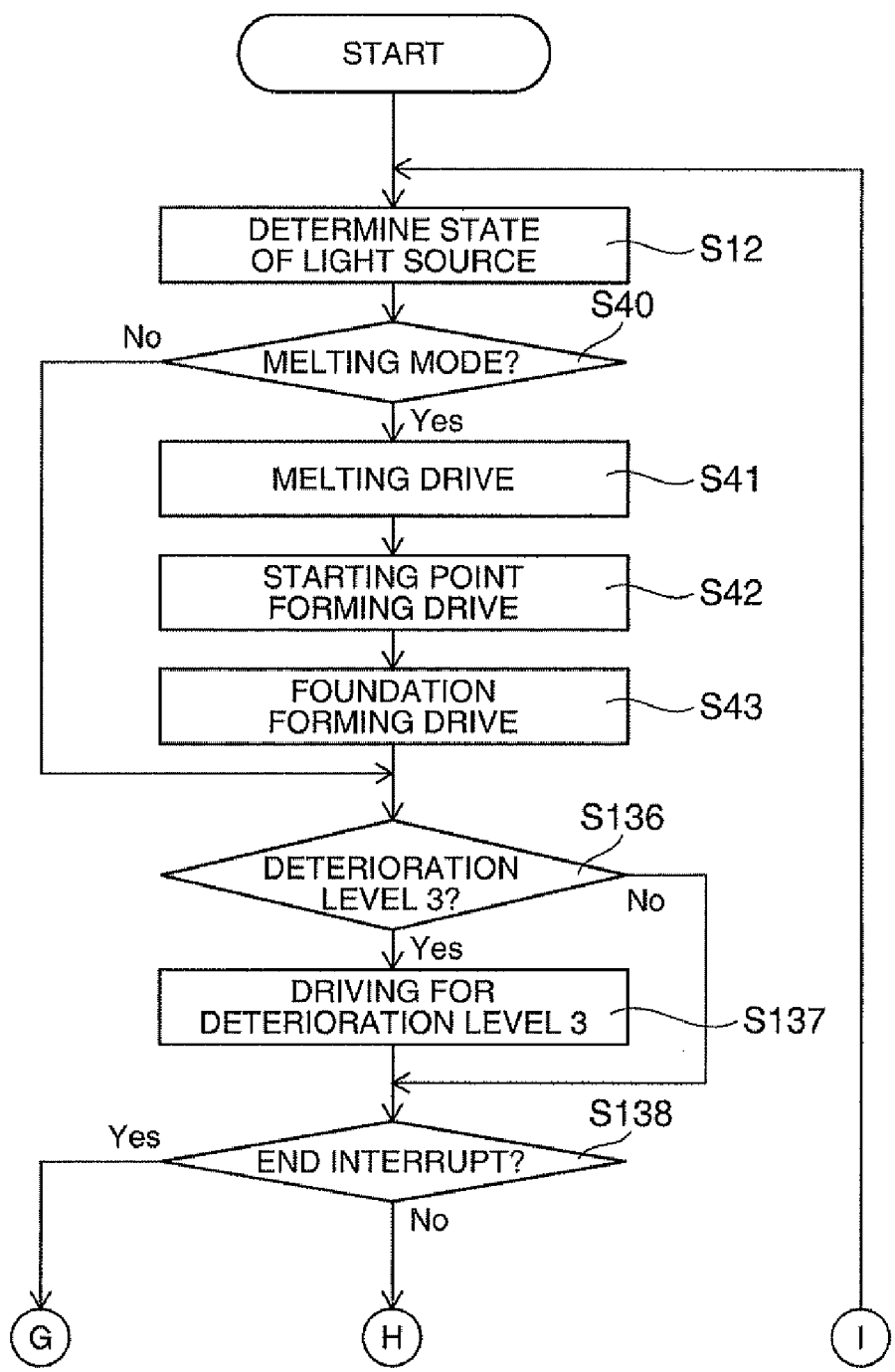
FIG. 12 is a flowchart (first half) for explaining the operation of a light source according to a third embodiment.
Figure 13:
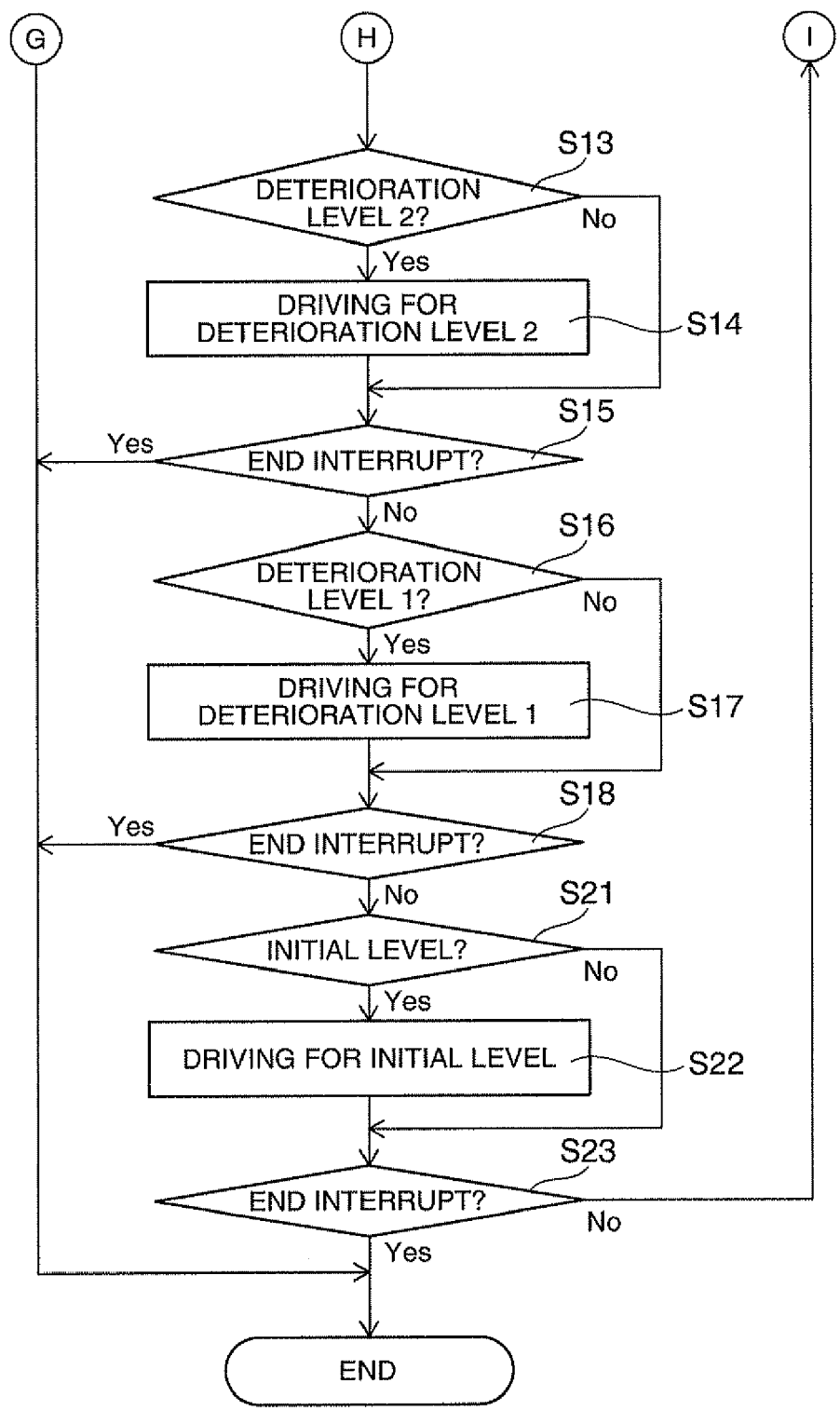
FIG. 13 is a flowchart (second half) for explaining the operation of the light source according to the third embodiment.

FIG. 12 and FIG. 13 are flowcharts for explaining the operation of the light source driving device 70. First, the determining unit 75 determines the state of the arc tube 1 immediately after power is turned on (step S12).

Next, the driving control unit 74 determines whether a melting mode for carrying out restoration of the arc tube 1 by melting is selected or not (step S40).

When the melting mode is selected, data corresponding to melting drive that enables formation of a melting part 62 shown in FIG. 5B is selected from the data stored in the data storage unit 76, and the melting drive is carried out by the lighting device 70a under the control of the driving control unit 74 (step S41). In this melting drive, the power supply condition for initial driving is partly changed, including, for example, (1) increase in the increase rate of the current supplied to the two electrodes 15 and 16 in start-up, (2) increase in the current setting value in the final period of start-up, (3) increase in the anode duty factor with respect to the electrode in question, of the two electrodes 15 and 16, (4) increase in the quantity of superimposition of a direct current with respect to the two electrodes 15 and 16, (5) adjustment of the superimposition rate of various waveforms that are superimposed on a rectangular wave, and (6) reduction in the frequency of the current supplied to the two electrodes 15 and 16 in start-up. As the melting drive is carried out in start-up, the protrusions 15a and 16a of the two electrodes 15 and 16 can be efficiently melted.

Next, starting point forming drive is carried out by the lighting device 70a under the control of the driving control unit 74 (step S42). This starting point forming drive is carried out, for example, immediately after a shift from the initial operation to the steady-state operation occurs. A high-frequency current is supplied to the two electrodes 15 and 16 until one of a predetermined time, a predetermined inter-electrode voltage and a predetermined inter-electrode current is reached. Thus, a small starting point is formed at the center of the melting part 62 formed in step S41. By this starting point forming drive, a stable protrusion starting point can be formed quickly and positional misalignment is less likely to occur in the subsequent formation of a foundation. Such starting point forming drive is carried out, for example, by supplying a rectangular wave with a frequency of 400 Hz to the two electrodes 15 and 16 for about two minutes. The waveform used in this case is, for example, the rear end pulse-combined rectangular wave J shown in FIG. 6B.

Next, foundation forming drive is carried out by the lighting device 70a under the control of the driving control unit 74 (step S43). This foundation forming drive is carried out as part of the steady-state operation. A low-frequency current is supplied to the two electrodes 15 and 16, and for example, a bottom half of the large-diameter part 65 as shown in FIG. 5C is formed around the starting point formed in step S42. This foundation forming drive is carried out, for example, by utilizing the rear triangle wave-combined rectangular wave I shown in FIG. 6B. Specifically, as the rear triangle wave I, a superimposed wave formed by superimposing a triangle wave with a leap rate of 10% on a rectangular wave is used, and the superimposed wave with 80 Hz is supplied to the two electrodes 15 and 16 for about ten minutes. Here, the leap rate of a triangle wave refers to the ratio of a maximum current value to an average current value in a half-cycle of a superimposed wave formed by superimposing a triangle wave onto a rectangular wave. Meanwhile, when the melting mode is not selected, the processing of steps S41 to S43 is omitted.

Then, the determining unit 75 determines whether the deterioration level of the arc tube 1 is the third stage or not, and outputs the result to the driving control unit 74 (step S136). The third stage of deterioration is more serious than the second stage of deterioration described with reference to FIG. 7 in the first embodiment. The third stage of deterioration is equivalent to the state where the inter-electrode distance between the first electrode 15 and the second electrode 16 is long. To determine whether the deterioration is equivalent to such a state or not, the result of the determination in step S12 stored in the data storage unit 76, specifically, the level of the applied voltage to the arc tube 1, the lighting time and the like can be used.

When it is determined in step S136 that the deterioration level is the third stage, data for lighting drive corresponding to the third stage of deterioration is selected from the data stored in the data storage unit 76, and the selected lighting drive is carried out by the lighting device 70a under the control of the driving control unit 74 (step S137). In this case, a power supply pattern formed by a combination of the exemplary first lighting waveform shown in FIG. 6A and the exemplary second lighting waveform shown in FIG. 6B is used. However, by adjustment of the combination rate of the second lighting waveform as will be described later, for example, a top half of the large-diameter part 65 as shown in FIG. 5C is formed. Meanwhile, if it is not determined in step S136 that the deterioration level is the third stage, the lighting drive in step S137 is omitted.

Now, the driving control unit 74 confirms whether an interrupt request signal that requests ending of the lighting operation of the light source unit 10 is inputted or not (step S138). When such an interrupt request signal is inputted, the driving control unit 74 records the driving condition into the data storage unit 76 and shifts the operation to lights-out operation.

When there is no request for end interrupt, the determining unit 75 determines whether the deterioration level of the arc tube 1 is the second stage or not, and outputs the result to the driving control unit 74 (step S13). The second stage of deterioration is a less serious level of deterioration than the third stage of deterioration described in step S136, but, it is equivalent to the state where the inter-electrode distance between the two electrodes 15 and 16 is long. To determine whether the deterioration is equivalent to such a state or not, the result of the determination in step S12 stored in the data storage unit 76, specifically, the level of the applied voltage to the arc tube 1, the lighting time and so on can be used.

When it is determined in step S13 that the deterioration level is the second stage, data for lighting drive corresponding to the second stage of deterioration is selected from the data stored in the data storage unit 76, and the selected lighting drive is carried out by the lighting device 70a under the control of the driving control unit 74 (step S14). In this case, a power supply pattern formed by a combination of the exemplary first lighting waveform shown in FIG. 6A and the exemplary second lighting waveform shown in FIG. 6B is used. However, by adjustment of the combination rate of the second lighting waveform as will be described later, for example, a bottom half of the small-diameter part 64 as shown in FIG. 5D is formed. Meanwhile, if it is not determined in step S13 that the deterioration level is the second stage, the lighting drive in step S14 is omitted.

Now, the driving control unit 74 confirms whether an interrupt request signal that requests ending of the lighting operation of the light source unit 10 is inputted or not (step S15). When such an interrupt request signal is inputted, the driving control unit 74 records the driving condition into the data storage unit 76 and shifts the operation to lights-out operation.

When there is no request for end interrupt, the determining unit 75 determines whether the deterioration level of the arc tube 1 is the first stage or not, and outputs the result to the driving control unit 74 (step S16). The first stage of deterioration in this case is equivalent to the first stage and second stage of deterioration described with reference to FIG. 7 in the first embodiment. To determine whether the deterioration is equivalent to such a state or not, the result of the determination in step S12 stored in the data storage unit 76, specifically, the level of the applied voltage to the arc tube 1, the lighting time and so on can be used.

When it is determined in step S16 that the deterioration level is the first stage, data for lighting drive corresponding to the first stage of deterioration is selected from the data stored in the data storage unit 76, and the selected lighting drive is carried out by the lighting device 70a under the control of the driving control unit 74 (step S17). In this case, a power supply pattern formed by a combination of the exemplary first lighting waveform shown in FIG. 6A and the exemplary second lighting waveform shown in FIG. 6B is used. However, by lighting drive with a power supply pattern in which the frequency of the second lighting waveform is made higher than in step S14, for example, a top half of the small-diameter part 64 as shown in FIG. 5D is formed. Meanwhile, if it is not determined in step S16 that the deterioration level is the first stage, the lighting drive in step S17 is omitted.

Now, the driving control unit 74 confirms whether an interrupt request signal that requests ending of the lighting operation of the light source unit 10 is inputted or not (step S18). When such an interrupt request signal is inputted, the driving control unit 74 records the driving condition into the data storage unit 76 and shifts the operation to lights-out operation.

The processing in steps S21 to S23 is similar to the specific example of the first embodiment shown in FIG. 8 and therefore will not be described further in detail.

A specific example of the operation described with reference to FIG. 12 and FIG. 13 will be described. In step S136, it is determined whether the arc tube 1 is in the third stage of deterioration or not. In this case, whether the deterioration level is the third stage or not depends on, for example, whether the voltage between the two electrodes 15 and 16 is greater than 95 V. In step S13, it is determined whether the arc tube 1 is in the second stage of deterioration or not. In this case, whether the deterioration level is the second stage or not depends on, for example, whether the voltage between the two electrodes 15 and 16 is greater than 85 V and equal to or less than 95 V. The first stage of deterioration corresponds to the case where, for example, the voltage between the two electrodes 15 and 16 is greater than 75 V and equal to or less than 85 V. The initial level corresponds to the case where, for example, the voltage between the two electrodes 15 and 16 is equal to or less than 75 V.

The lighting drive corresponding to the third stage of deterioration, carried out in step S137, uses the central pulse-combined rectangular wave C and the rear triangle wave-combined rectangular wave G. The combination ratio, that is, the driving time ratio between the central pulse-combined rectangular wave C and the rear triangle wave-combined rectangular wave G is 1:1. In this case, both the frequency of the first lighting waveform and the frequency of the second lighting waveform are 100 Hz. The first lighting waveform and the second lighting waveform are alternately outputted.

Also the lighting drive corresponding to the second stage of deterioration, carried out in step S14, uses the central pulse-combined rectangular wave C and the rear triangle wave-combined rectangular wave G. The combination ratio, that is, the driving time ratio between the central pulse-combined rectangular wave C and the rear triangle wave-combined rectangular wave G is 1:12. In this case, both the frequency of the first lighting waveform and the frequency of the second lighting waveform are 100 Hz. One first lighting waveform and corresponding plural second lighting waveforms are alternately outputted. Thus, while driving with the first lighting waveform is carried out for a predetermined period, driving with the second lighting waveform is carried out over a period that is 12 times the predetermined period.

Also the lighting drive corresponding to the first stage of deterioration, carried out in step S17, uses the central pulse-combined rectangular wave C and the rear triangle wave-combined rectangular wave G. The combination ratio, that is, the driving time ratio between the central pulse-combined rectangular wave C and the rear triangle wave-combined rectangular wave G is 1:12. In this case, the frequency of the first lighting waveform is 100 Hz and the frequency of the second lighting waveform is 400 Hz. One first lighting waveform and corresponding plural second lighting waveforms are alternately outputted. Thus, while driving with the first lighting waveform is carried out for a predetermined period, driving with the second lighting waveform is carried out over a period that is 12 times the predetermined period.

The lighting drive corresponding to the initial level of deterioration, carried out in step S22, only uses a rectangular wave. In this case, the frequency of the rectangular wave is 100 Hz.

The invention is not limited to the above embodiments and can be carried out in various embodiments without departing from the scope of the invention. For example, the following modifications can be made.

For example, in the embodiments, the lighting drive shown in FIG. 4A to FIG. 4C or FIG. 5A to FIG. 5D is carried out as part of the steady-state operation. However, apart from the general steady-state operation, the lighting drive shown in FIG. 4A to FIG. 4C or FIG. 5A to FIG. 5D can be carried out at any time for the purpose of reproducing or restoring the two electrodes 15 and 16 in a special process.

As a lamp used for the light source unit 10, various lamps can be used such as a high-pressure mercury lamp and a metal halide lamp.

In the projector 200 of the embodiment, the pair of fly-eye lenses 23a and 23b is used to divide light from the light source 100 into plural partial luminous fluxes. However, the invention can also be applied to a projector which does not use such fly-eye lenses, that is, a lens array. Moreover, the fly-eye lenses 23a and 23b can be replaced by a rod integrator.

In the projector 200, the polarization conversion element 24 is used that polarizes light from the light source 100 into a specific direction. However, the invention can also be applied to a projector which does not use the polarization conversion element 24.

In the embodiment, the invention is applied to a transmission-type projector. However, the invention can also be applied to a reflection-type projector. The "transmission-type" projector refers to a type of projector in which liquid crystal light valves including liquid crystal panels transmit light. The "reflection-type" projector refers to a type of projector in which liquid crystal light valves reflect light. The light modulator is not limited to a liquid crystal panel and may be, for example, a light modulator using a micro mirror.

There is a front-side projector that projects an image from a direction of observing a projection surface, and a rear-side projector that projects an image from the opposite side to the direction of observing the projection surface. The configuration of the projector shown in FIG. 9 can be applied to both.

In the embodiment, only the projector 200 using the three liquid crystal panels 41a to 41c is described as an example. However, the invention can also be applied to a projector using only one liquid crystal panel, a projector using two liquid crystal panels or a projector using four or more liquid crystal panels.

In the embodiment, light modulation of each color is carried out using the color separation system 30 and the liquid crystal light valves 40a, 40b and 40c. However, color light modulation and combination can also be carried out, for example, by using a combination of a color wheel illuminated by the light source 100 and the illumination system 20, and a device formed by pixels of a micro mirror and irradiated with transmitted light from the color wheel, instead of using the color separation system 30 and the liquid crystal light valves 40a, 40b and 40c.

The entire disclosure of Japanese Patent Application No. 2007-282894, filed Oct. 31, 2007 is expressly incorporated by reference herein.

What is claimed is:

1. A light source comprising:
an arc tube having a first electrode and a second electrode that emit light by discharge between the electrodes; and
a driving unit that supplies a current between the first electrode and the second electrode and can change at least a waveform, of frequency and waveform of the supplied current;
the driving unit performing a lighting drive of the arc tube by supplying the current in a driving waveform formed by combining a first lighting waveform having a maximum current value at a part other than a half-cycle rear end of the waveform and a second lighting waveform having a maximum current value at the half-cycle rear end of the waveform.

2. The light source according to claim 1,
when an inter-electrode distance between the first electrode and the second electrode becomes longer than a predetermined value, the driving unit performs the lighting drive using at least the first lighting waveform.

3. A projector comprising:
the light source according to claim 2;
a light modulator that is illuminated by illumination light from the light source; and
a projection system that projects an image formed by the light modulator.

4. The light source according to claim 1,
the driving unit changing a temporal rate at which the first lighting waveform and the second lighting waveform are combined, with the lapse of time.

5. A projector comprising:
the light source according to claim 4;
a light modulator that is illuminated by illumination light from the light source; and
a projection system that projects an image formed by the light modulator.

6. The light source according to claim 1,
the driving unit making the period of using the first lighting waveform relatively short as the inter-electrode distance becomes relatively short.

7. A projector comprising:
the light source according to claim 6;
a light modulator that is illuminated by illumination light from the light source; and
a projection system that projects an image formed by the light modulator.

8. The light source according to claim 1,
in the lighting drive, the driving unit causing the driving period of the first lighting waveform to be equal to or shorter than the driving period of the second lighting waveform.

9. The light source according to claim 1,
the driving unit being provided with a period in which the first lighting waveform and the second lighting waveform are driven with different frequencies from each other.

10. The light source according to claim 9,
the frequency of the first lighting waveform being lower than the frequency of the second lighting waveform.

11. The light source according to claim 9,
the driving unit changing the frequency of at least one of the first lighting waveform and the second lighting waveform with the lapse of time.

12. The light source according to claim 11,
the driving unit changing the second lighting waveform to a relatively high frequency as the inter-electrode distance becomes relatively short.

13. The light source according to claim 1,
the driving unit carrying out: a first process of driving the first lighting waveform and the second lighting waveform while changing the temporal rate at which the first lighting waveform and the second lighting waveform are combined; and a second process of driving the first lighting waveform and the second lighting waveform while changing the frequency of at least one of the first lighting waveform and the second lighting waveform to a higher frequency than in the first process; and when the inter-electrode distance becomes shorter to a distance equal to or less than a predetermined threshold value, the driving unit switches from the first process to the second process.

14. The light source according to claim 13,
the distal end side of at least one of the first electrode and the second electrode being melted by a predetermined quantity before either the first process or the second process.

15. The light source according to claim 14,
after the melting, a preparation being carried out by supplying a high-frequency current between the first electrode and the second electrode until one of a predetermined time, a predetermined inter-electrode voltage and a predetermined inter-electrode current is reached, and after that, supplying a low-frequency current between the first electrode and the second electrode.

16. The light source according to claim 15,
after performing the preparation, the driving unit carrying out driving in the first process.

17. The light source according to claim 1, further comprising
a determining unit that determines the state of the arc tube,
the determining unit determining the state of the distal end side of the first electrode and the second electrode on the basis of at least one of a lamp voltage, current, and illuminance of the arc tuber and their change values.

18. A projector comprising:
the light source according to claim 1;
a light modulator that is illuminated by illumination light from the light source; and
a projection system that projects an image formed by the light modulator.

19. A method for driving a light source that supplies a current between a first electrode and a second electrode of discharge light emitting type, the method comprising:
changing at least a waveform, of frequency and waveform of the current supplied between the first electrode and the second electrode, thereby changing a driving state; and
performing lighting drive of an arc tube by supplying the current in a driving waveform formed by combining a first lighting waveform having a maximum current value at a part other than a half-cycle rear part of the waveform and a second lighting waveform having a maximum current value at the half-cycle rear part of the waveform.

20. The driving method for the light source according to claim 19,
when an inter-electrode distance between the first electrode and the second electrode becomes longer than a predetermined value, the lighting drive is carried out using at least the first lighting waveform.

* * * * *